United States Patent
Cunningham

(10) Patent No.: US 10,582,824 B2
(45) Date of Patent: *Mar. 10, 2020

(54) CENTRAL VACUUM CLEANING SYSTEM CONTROL SUBSYSTEMS

(71) Applicant: CUBE INVESTMENTS LIMITED, Aurora (CA)

(72) Inventor: J. Vern Cunningham, Aurora (CA)

(73) Assignee: CUBE INVESTMENTS LIMITED, Aurora, ON (CA)

(*) Notice: Subject to any disclaimer, the term of this patent is extended or adjusted under 35 U.S.C. 154(b) by 48 days.

This patent is subject to a terminal disclaimer.

(21) Appl. No.: 15/621,607

(22) Filed: Jun. 13, 2017

(65) Prior Publication Data

US 2017/0273533 A1 Sep. 28, 2017

Related U.S. Application Data

(63) Continuation of application No. 12/155,094, filed on May 29, 2008, now Pat. No. 9,693,667, which is a (Continued)

(51) Int. Cl.
*A47L 9/28* (2006.01)
*A47L 5/38* (2006.01)
(Continued)

(52) U.S. Cl.
CPC .............. *A47L 9/2894* (2013.01); *A47L 5/38* (2013.01); *A47L 9/2805* (2013.01);
(Continued)

(58) Field of Classification Search
CPC ........ A47L 5/38; A47L 9/2894; A47L 9/2805; A47L 9/2831; A47L 9/2842;
(Continued)

(56) References Cited

U.S. PATENT DOCUMENTS 1,601,531 A  9/1926 Jeannin
1,883,288 A  10/1932 Zubaty
(Continued)

FOREIGN PATENT DOCUMENTS

AU  2003200702  5/2003
CA  2088035  7/1994
(Continued)

OTHER PUBLICATIONS

Vacuum Dealers Trade Association Magazine, Advertisement: Discover Real Power with Hayden Central Vacuum Super Vac, Sep. 1997.
(Continued)

*Primary Examiner* — Robert J Scruggs

(57) ABSTRACT

A central vacuum cleaning system including a receptacle for receiving dirt; conduits terminating in valves to which a flexible hose may be attached; a motor for generating airflow through the conduits to the receptacle; a motor control circuit controlling power to the motor; and a remote module receiving, through a communications medium from the motor control circuit, signals indicating an operating condition of the central vacuum cleaning system.

14 Claims, 12 Drawing Sheets

Related U.S. Application Data continuation of application No. 10/936,699, filed on Sep. 9, 2004, now Pat. No. 7,403,360, which is a continuation-in-part of application No. 10/843,321, filed on May 12, 2004, now Pat. No. 6,856,113.

(51) Int. Cl.
*H01R 13/66* (2006.01)
*H01R 13/717* (2006.01)
*H02H 7/08* (2006.01)

(52) U.S. Cl.
CPC ......... *A47L 9/2831* (2013.01); *A47L 9/2842* (2013.01); *A47L 9/2857* (2013.01); *A47L 9/2884* (2013.01); *A47L 9/2889* (2013.01); *H01R 13/6658* (2013.01); *H01R 13/717* (2013.01); *H01R 13/7172* (2013.01); *H01R 13/7175* (2013.01); *H02H 7/0833* (2013.01); *Y02B 40/82* (2013.01)

(58) Field of Classification Search
CPC .... A47L 9/2857; A47L 9/2884; A47L 9/2889; A47L 9/28; B08B 15/002; D01H 111/005; B23Q 11/0046; B65H 2701/03; H01R 13/6658; H01R 13/717; H01R 13/7172; H01R 13/7175; H02H 7/0833; Y02B 40/82
See application file for complete search history.

(56) References Cited

U.S. PATENT DOCUMENTS

| | | | |
|---|---|---|---|
| 3,088,484 A | 5/1963 | Marsh | |
| 3,357,039 A | 12/1967 | Hayward | |
| 3,382,524 A | 5/1968 | Sandstrom | |
| 3,477,689 A | 11/1969 | Berghoefer | |
| 3,483,503 A | 12/1969 | Paradiso | |
| 3,565,103 A | 2/1971 | Maselek | |
| 3,570,809 A | 3/1971 | Stuy | |
| 3,626,545 A * | 12/1971 | Sparrow | A47L 5/38 15/314 |
| 3,628,769 A | 12/1971 | Lee | |
| 3,661,356 A | 5/1972 | Tucker | |
| 3,663,845 A | 5/1972 | Apstein | |
| 3,676,986 A | 7/1972 | Reiling | |
| 3,826,464 A | 7/1974 | Berghoefer | |
| 3,855,665 A | 12/1974 | Schwartz | |
| 3,965,526 A | 6/1976 | Doubleday | |
| 3,989,311 A | 11/1976 | Debrey | |
| 4,021,879 A | 5/1977 | Brigham | |
| 4,056,334 A | 11/1977 | Fortune | |
| 4,070,586 A | 1/1978 | Breslin | |
| 4,111,615 A | 9/1978 | Watanabe | |
| 4,114,557 A | 9/1978 | De Brey | |
| 4,175,892 A | 11/1979 | De Brey | |
| 4,225,272 A | 9/1980 | Palmovist | |
| 4,227,258 A | 10/1980 | Root et al. | |
| 4,238,689 A | 12/1980 | Breslin et al. | |
| 4,246,675 A | 1/1981 | Costanzo | |
| 4,300,262 A | 11/1981 | Rodowsky, Jr. et al. | |
| 4,336,427 A | 6/1982 | Lindsay | |
| 4,368,348 A | 1/1983 | Eichelberger et al. | |
| 4,369,543 A | 1/1983 | Chen et al. | |
| 4,370,776 A | 2/1983 | Kullik | |
| 4,443,906 A | 4/1984 | Tucker et al. | |
| 4,473,923 A | 10/1984 | Neroni et al. | |
| 4,490,575 A | 12/1984 | Kutnyak | |
| 4,494,270 A | 1/1985 | Ritzau et al. | |
| 4,513,469 A | 4/1985 | Godfrey et al. | |
| 4,531,796 A | 7/1985 | Gansert et al. | |
| 4,536,674 A | 8/1985 | Schmidt | |
| 4,591,368 A | 5/1986 | MacDuff | |
| 4,611,365 A | 9/1986 | Komatsu et al. | |
| 4,654,924 A * | 4/1987 | Getz | A47L 9/0411 15/319 |
| 4,664,457 A | 5/1987 | Suchy | |
| 4,680,827 A | 7/1987 | Hummel | |
| 4,683,515 A | 7/1987 | Beihoff et al. | |
| 4,688,596 A | 8/1987 | Liebmann | |
| 4,693,324 A | 9/1987 | Choiniere et al. | |
| 4,731,545 A | 3/1988 | Lerner et al. | |
| 4,757,574 A | 7/1988 | Sumerau | |
| 4,758,170 A | 7/1988 | Hayden | |
| 4,766,628 A | 8/1988 | Walker | |
| 4,791,700 A | 12/1988 | Bigley et al. | |
| 4,829,625 A | 5/1989 | Wang | |
| 4,829,626 A | 5/1989 | Harkonen et al. | |
| 4,854,887 A | 8/1989 | Blandin | |
| 4,881,909 A | 11/1989 | Blackman | |
| 4,883,982 A | 11/1989 | Forbes et al. | |
| 4,915,640 A | 4/1990 | Hayden | |
| D315,043 S | 2/1991 | Hayden | |
| 4,991,253 A | 2/1991 | Rechsteiner | |
| 4,996,737 A | 3/1991 | Madru, Sr. | |
| 5,033,151 A | 7/1991 | Kraft et al. | |
| 5,067,394 A | 11/1991 | Cavallero | |
| 5,068,555 A | 11/1991 | Oberdorfer-Bogel | |
| 5,107,565 A | 4/1992 | Chun | |
| 5,109,568 A | 5/1992 | Rohn et al. | |
| 5,111,841 A | 5/1992 | Houston | |
| 5,120,983 A | 6/1992 | Samann | |
| 5,125,125 A | 6/1992 | Barsacq | |
| D333,023 S | 2/1993 | Herron, Jr. | |
| 5,185,705 A | 2/1993 | Farrington | |
| D334,447 S | 3/1993 | Rohn | |
| 5,191,673 A | 3/1993 | Damizet | |
| 5,207,498 A | 5/1993 | Lawrence et al. | |
| 5,243,732 A | 9/1993 | Koharagi et al. | |
| 5,244,409 A | 9/1993 | Guss et al. | |
| 5,255,409 A | 10/1993 | Fujiwara et al. | |
| 5,263,502 A | 11/1993 | Dick | |
| 5,265,305 A | 11/1993 | Kraft et al. | |
| D342,054 S | 12/1993 | Woodman | |
| 5,274,578 A | 12/1993 | Noeth et al. | |
| 5,274,878 A | 1/1994 | Radabaugh et al. | |
| 5,276,434 A | 1/1994 | Brooks et al. | |
| 5,276,939 A | 1/1994 | Uenishi | |
| 5,277,468 A | 1/1994 | Blatt et al. | |
| 5,294,872 A | 3/1994 | Koharagi et al. | |
| 5,298,821 A | 3/1994 | Michel | |
| 5,301,385 A | 4/1994 | Abe et al. | |
| 5,311,639 A | 5/1994 | Boshler | |
| 5,343,590 A | 9/1994 | Radabaugh | |
| 5,347,186 A | 9/1994 | Konotchick | |
| 5,349,146 A | 9/1994 | Radabaugh | |
| 5,353,468 A | 10/1994 | Yap et al. | |
| 5,363,534 A | 11/1994 | Dekker et al. | |
| 5,379,796 A | 1/1995 | Wang | |
| 5,391,064 A | 2/1995 | Lopez et al. | |
| 5,404,612 A | 4/1995 | Ishikawa | |
| 5,409,398 A | 4/1995 | Chadbourne et al. | |
| 5,448,827 A | 9/1995 | Ward | |
| D364,014 S | 11/1995 | Langeland et al. | |
| 5,479,676 A | 1/1996 | Martin et al. | |
| 5,504,971 A | 4/1996 | McCormick | |
| 5,507,067 A | 4/1996 | Hoekstra et al. | |
| 5,512,883 A | 4/1996 | Lane, Jr. | |
| 5,525,842 A | 4/1996 | Leininger | |
| 5,515,572 A | 5/1996 | Hoekstra et al. | |
| 5,542,146 A | 8/1996 | Hoekstra et al. | |
| 5,554,049 A | 9/1996 | Reynolds | |
| 5,554,917 A | 9/1996 | Kurz et al. | |
| 5,560,076 A | 10/1996 | Leung | |
| 5,568,374 A | 10/1996 | Lindeboom et al. | |
| 5,572,767 A | 11/1996 | Ishikawa | |
| 5,578,795 A | 11/1996 | Ward | |
| 5,606,767 A | 3/1997 | Crlenjak et al. | |
| 5,638,575 A | 6/1997 | Sin | |
| 5,655,884 A | 8/1997 | Rose | |
| 5,698,957 A | 12/1997 | Sowada | |
| 5,713,656 A | 2/1998 | Lin | |
| 5,722,110 A | 3/1998 | McIntyre et al. | |

(56) References Cited

U.S. PATENT DOCUMENTS

| | | | |
|---|---|---|---|
| 5,737,797 A | 4/1998 | Rittmueller et al. |
| 5,737,798 A | 4/1998 | Moren et al. |
| 5,740,581 A | 4/1998 | Harrelson |
| 5,740,582 A | 4/1998 | Harrelson, II |
| 5,747,973 A | 5/1998 | Robitaille et al. |
| 5,753,989 A | 5/1998 | Syverson et al. |
| 5,813,085 A | 9/1998 | Fritz et al. |
| 5,815,883 A | 10/1998 | Stein et al. |
| 5,815,884 A | 10/1998 | Imamura |
| 5,816,685 A | 10/1998 | Hou |
| 5,850,665 A | 12/1998 | Bousset |
| 5,871,152 A | 2/1999 | Saney |
| D406,422 S | 3/1999 | Burchard et al. |
| 5,893,194 A | 4/1999 | Karmel |
| 5,896,618 A | 4/1999 | Woo et al. |
| 5,917,428 A | 6/1999 | Discenzo et al. |
| 5,918,728 A | 7/1999 | Syverson |
| 5,924,163 A | 7/1999 | Burns, Jr. |
| 5,924,164 A | 7/1999 | Lindsay, Jr. |
| 5,926,908 A | 7/1999 | Lindsay, Jr. |
| 5,926,909 A | 7/1999 | McGee et al. |
| 5,938,061 A | 8/1999 | Ward et al. |
| 5,945,749 A | 8/1999 | Li |
| 5,983,443 A | 11/1999 | Redding |
| 5,987,697 A | 11/1999 | Song et al. |
| 6,011,334 A | 1/2000 | Roland |
| 6,012,199 A | 1/2000 | Litomisky et al. |
| 6,029,309 A | 2/2000 | Imamura |
| 6,033,082 A | 3/2000 | Lin |
| 6,042,656 A | 3/2000 | Knutson |
| 6,049,143 A | 4/2000 | Simpson et al. |
| 6,101,667 A | 8/2000 | Ishikawa |
| D431,335 S | 9/2000 | Mehaffey et al. |
| 6,143,996 A | 11/2000 | Skanda |
| 6,167,588 B1 | 1/2001 | Dyson |
| 6,169,258 B1 | 1/2001 | Roney et al. |
| 6,206,181 B1 | 3/2001 | Syverson |
| 6,218,798 B1 | 4/2001 | Price |
| 6,232,696 B1 | 5/2001 | Kim et al. |
| 6,239,576 B1 | 5/2001 | Breslin et al. |
| 6,244,427 B1 | 6/2001 | Syverson |
| 6,253,414 B1 | 7/2001 | Bradd et al. |
| 6,256,833 B1 | 7/2001 | Steinberg |
| 6,323,570 B1 | 11/2001 | Nishimura et al. |
| 6,329,785 B1 | 12/2001 | Starkie et al. |
| 6,336,825 B1 | 1/2002 | Seefried |
| 6,425,293 B1 | 7/2002 | Woodroffe et al. |
| 6,459,056 B1 | 10/2002 | Graham |
| 6,463,368 B1 | 10/2002 | Feiten et al. |
| 6,488,475 B2 | 12/2002 | Murata et al. |
| 6,516,492 B1 | 2/2003 | Kang |
| 6,526,622 B2 | 3/2003 | Conrad |
| 6,546,814 B1 | 4/2003 | Choe et al. |
| 6,581,241 B2 | 6/2003 | Shaver et al. |
| 6,605,156 B1 | 8/2003 | Clark et al. |
| 6,628,019 B2 | 9/2003 | Carroll |
| 6,658,325 B2 | 12/2003 | Zweig |
| 6,664,748 B2 | 12/2003 | Kushida et al. |
| 6,685,491 B2 | 2/2004 | Gergek |
| 6,690,804 B2 | 2/2004 | Everett |
| D494,332 S | 8/2004 | Schroeter |
| D494,333 S | 8/2004 | Schroeter |
| 6,779,228 B2 | 8/2004 | Plomteux et al. |
| 6,791,205 B2 | 9/2004 | Woodbridge |
| 6,817,058 B1 | 11/2004 | Harrelson, II |
| 6,822,353 B2 | 11/2004 | Koga et al. |
| 6,864,594 B2 | 3/2005 | Seki |
| 6,900,565 B2 | 5/2005 | Preston |
| 6,975,043 B2 | 12/2005 | Schumacher et al. |
| 6,975,993 B1 | 12/2005 | Lin |
| 7,051,398 B2 | 5/2006 | Smith et al. |
| 7,080,425 B2 | 7/2006 | Smith et al. |
| 7,114,216 B2 | 10/2006 | Stephens et al. |
| 7,122,921 B2 | 10/2006 | Hall et al. |
| 7,237,298 B2 | 7/2007 | Reindle et al. |
| 7,269,877 B2 | 9/2007 | Tondra et al. |
| 7,328,479 B2 | 2/2008 | Willenbring |
| 7,331,083 B2 | 2/2008 | Overvaag et al. |
| 7,342,372 B2 | 3/2008 | Jonsson et al. |
| 7,363,679 B2 | 4/2008 | Zimmerle et al. |
| 7,403,360 B2 * | 7/2008 | Cunningham ............ A47L 5/38 361/31 |
| 7,406,744 B2 | 8/2008 | Bruneau |
| 9,693,667 B2 * | 7/2017 | Cunningham ............ A47L 5/38 |
| 2001/0028239 A1 | 10/2001 | Vanderhenst |
| 2002/0001190 A1 | 1/2002 | Everett |
| 2002/0044243 A1 | 4/2002 | Kim et al. |
| 2002/0127916 A1 | 9/2002 | Zhang |
| 2002/0152576 A1 | 10/2002 | Murray et al. |
| 2002/0170138 A1 | 11/2002 | Huebsch et al. |
| 2003/0014160 A1 | 1/2003 | Nordquist et al. |
| 2003/0044243 A1 | 3/2003 | Tisdale |
| 2003/0140443 A1 | 7/2003 | Najm |
| 2003/0196293 A1 | 10/2003 | Ruff |
| 2003/0229421 A1 | 12/2003 | Chmura et al. |
| 2004/0031506 A1 | 2/2004 | Tsai |
| 2004/0049868 A1 | 3/2004 | Ng |
| 2004/0144633 A1 | 7/2004 | Gordon et al. |
| 2004/0150271 A1 | 8/2004 | Koga et al. |
| 2004/0172782 A1 | 9/2004 | Smith |
| 2004/0177468 A1 | 9/2004 | Smith et al. |
| 2004/0231090 A1 | 11/2004 | Kushida et al. |
| 2004/0261211 A1 | 12/2004 | Overvaag et al. |
| 2005/0022329 A1 | 2/2005 | Harman et al. |
| 2005/0022337 A1 | 2/2005 | Roney et al. |
| 2005/0166351 A1 | 8/2005 | Cunningham et al. |
| 2005/0236012 A1 | 10/2005 | Josefsson |
| 2005/0245194 A1 | 11/2005 | Hayes et al. |
| 2005/0254185 A1 | 11/2005 | Cunningham |
| 2007/0017057 A1 | 1/2007 | Zimmerle et al. |
| 2007/0283521 A1 | 12/2007 | Foster et al. |
| 2008/0066252 A1 | 3/2008 | Herron, Jr. |
| 2008/0222836 A1 | 9/2008 | Cunningham |
| 2008/0301903 A1 | 12/2008 | Cunningham et al. |

FOREIGN PATENT DOCUMENTS

| | | | |
|---|---|---|---|
| CA | 2338338 | | 2/2000 |
| CA | 2369390 | * | 1/2002 |
| CA | 2369390 | A1 | 1/2002 |
| CA | 2358648 | | 4/2003 |
| DE | 19940663 | | 3/2001 |
| EP | 0192469 | | 8/1986 |
| EP | 0347223 | | 12/1989 |
| EP | 0499235 | | 8/1992 |
| EP | 0552978 | | 7/1993 |
| EP | 0711023 | | 5/1996 |
| EP | 0773619 | | 5/1997 |
| EP | 2281507 | | 2/2011 |
| GB | 2281507 | | 3/1995 |
| GB | 2288115 | | 10/1995 |
| JP | S53058160 | | 5/1978 |
| JP | S53128158 | | 11/1978 |
| JP | 6-026494 | | 2/1985 |
| JP | S61281309 | | 12/1986 |
| JP | 6277167 | | 4/1987 |
| JP | 64-049526 | | 2/1989 |
| JP | 64-49526 | | 2/1989 |
| JP | 2-152420 | | 6/1990 |
| JP | H02268714 | | 11/1990 |
| JP | 2-152419 | | 12/1990 |
| JP | H3086127 | | 4/1991 |
| JP | H3086128 | | 4/1991 |
| JP | 4-017830 | | 1/1992 |
| JP | 04-58928 | | 2/1992 |
| JP | 05-003839 | | 1/1993 |
| JP | H53839 | | 1/1993 |
| JP | 5-317213 | | 3/1993 |
| JP | 06-304107 | | 1/1994 |
| JP | 06-304107 | | 11/1994 |
| JP | 7-095944 | | 4/1995 |
| JP | 7322980 | | 12/1995 |
| JP | 08-033596 | | 2/1996 |
| JP | 08-065876 | | 3/1996 |

(56) References Cited

FOREIGN PATENT DOCUMENTS

| | | |
|---|---|---|
| JP | 08-117165 | 5/1996 |
| JP | 8-240329 | 9/1996 |
| JP | 9-149871 | 6/1997 |
| JP | 10-094504 | 4/1998 |
| JP | 10-248775 | 9/1998 |
| JP | 10-276946 | 10/1998 |
| JP | 2000-116577 | 4/2000 |
| JP | 2000116577 | 4/2000 |
| JP | 2001137158 | 5/2001 |
| JP | 2001-314359 | 11/2001 |
| JP | 2002078656 | 3/2002 |
| JP | 2002095613 | 4/2002 |
| JP | 2002320577 | 11/2002 |
| JP | 2003164395 | 6/2003 |
| JP | 2003-235767 | 8/2003 |
| JP | 2005-102465 | 4/2005 |
| KR | 100232107 | 7/1999 |
| KR | 100232535 | 7/1999 |
| KR | 2000162418 | 3/2000 |
| KR | 200186156 | 6/2000 |
| KR | 20030039876 | 5/2003 |
| KR | 2000348709 | 4/2004 |
| WO | 97/37423 | 10/1997 |
| WO | 9737423 A2 | 10/1997 |
| WO | 99/56606 | 11/1997 |
| WO | 9741631 | 11/1997 |
| WO | 199832363 | 7/1998 |
| WO | 98/35160 | 8/1998 |
| WO | 99/09875 | 3/1999 |
| WO | WO0064323 | 11/2000 |
| WO | 01/28401 | 4/2001 |
| WO | 0128401 | 4/2001 |
| WO | 200419745 | 3/2004 |
| WO | 2005/031169 | 4/2005 |

OTHER PUBLICATIONS

Nutone, Advertisement: "What's behind the Green Light?" May 1998.
ADAQ Magazine, Article by Vern Cunningham: "Tek-Talk: Relays and Triacs" Mar. 1998.
Floor Care Professional Magazine, Advertisement: "Hayden Super System Just Watch It" Jul. 1998.
Floor Care Professional Magazine, Article: "Team Haden Shares 'Roadmap to Success'" Aug. 1998.
ADAQ Magazine, Article by Vern Cunningham: "Tek-Talk: Radio Frequency Controls/Sound Activation Controls/Visual Status Indication" Dec. 1998.
ADAQ Magazine, Article by Vern Cunningham and Don Wiles: "Tek-Talk: Electric Brushes" Mar. 1999.
Floor Care Professional Magazine, Article: "Beam's IntelliWatch System Offers Consumers a Worry-Free Warranty" Mar. 1999.
M&S Advertisement: "Vacuums for Over Fifty Years" Apr. 1999.
ADAQ Magazine, Article by Vern Cunningham: "Tek-Talk: Microprocessors" Aug. 1999.
ADAQ Magazine, Article by Vern Cunningham: "Tek-Talk: Sensors" Mar. 2000.
Central Vacuum Professional Magazine, Article : "Alutron Modules Inc. and Power Excellence Ltd. : Leadership Through Innovation" Jun. 2000.
Central Vacuum Professional Magazine, Advertisement : "SuperVac Hayden Central Vacuum" Jun. 2000.
ADAQ Magazine, Article by Vern Cunningham: "Tek-Talk: Radio Frequency Controls" Dec. 2000.
CVDA Magazine, Article by Vern Cunningham: "TekTalk: LED Technology" Jun. 2001.
Alutron Advertisement: "Diversify with these Innovative Add-On Products" Nov. 2001.
Floor Care Professional Magazine, Advertisement: "GHIBLI" Jul. 2002.
Central Vacuum Professional Magazine, Advertisement: "The Sistem Air Has Landed" Aug. 2002.
Heritage Central Vacuum, Crush Proof Hoses Non-Electric, http://www.heritagevac.com/hosesnonelectric.html, printed Sep. 21, 2005, pp. 4, Azusa, USA.
International Search Report for PCT/CA2005/000715 dated Aug. 30, 2009.
International Preliminary Report on Patentability & Written Opinion of the International Search Authority from PCT/ CA2005/000715 dated Nov. 14, 2006.
The Eureka Company, Cordless, Rechargeable Vacuum Cleaner, Household Type, Owner's Guide, Model 570, 2000, pp. 12, Bloomington, USA.
The Eureka Company, Cordless, Rechargeable Vacuum Cleaner, Household Type, Owners Guide, Model 96B, 2001, pp. 12, Bloomington, USA.
Ultimate Air Inc., The UltimateAir RecoupAerator 200DX Energy Recovery Ventilator, Owner's Manual and Installation Guide, Jan. 24, 2006, pp. i-iv, 1-41Athens, USA.
Supplementary European Search Report dated Mar. 5, 2009 for 05745156.
Supplementary European Search Report for EP 05745156.9 dated Mar. 5, 2009.
Office Action for U.S. Appl. No. 12/078,684 dated Oct. 8, 2009.
A letter dated Sep. 9, 2003 from Les Industries Trovac Ltee., introducing new central vacuum system products, referred to as Cyclo Vac.
A listing of components, dated Jul. 2003, for a Cyclo Vac central vacuum system product called DL140SV-TUCYD14A, including component ELEREL20.
An invoice dated Jun. 3, 2002, from Avnan Electro Inc. to Les Industries Trovac Ltee, for item No. 120-MCM4S315A (ELEREL20).
A bill of material dated Oct. 24, 2003, for item No. 120-MCM4S315A.
A bill of material dated Nov. 22, 2002, for part PCA-DB002-RevB, found in the bill of material for item No. 120-MCM4S315A.
A document dated Oct. 24, 2003 describing the features of item No. 120-MCM4S315A.
Extended European Search Report for EP 05788490.0 dated Jul. 13, 2009.
Final Office Action dated Jun. 25, 2014 for U.S. Appl. No. 12/078,684.
A letter dated Aug. 24, 2000 from AVNAN Electro Inc, discussing design of central vacuum cleaner.
A letter dated Jun. 5, 2001 from AVNAN Electro Inc, reporting update of power control modules-features.
A invoice dated Jun. 19, 2001 from AVNAN Electro Inc, regarding prices for prototypes and engineering development.
A letter dated Sep. 19, 2001 from AVNAN Electro Inc, regarding Quatation for power control modules-features.
A letter dated Oct. 16, 2001 from AVNAN Electro Inc, regarding CV Speed Control Project.
A letter dated Nov. 19, 2001 from AVNAN Electro Inc, regarding CV Speed Control Project-Switch Assembly.
A invoice dated Nov. 30, 2001 from AVNAN Electro Inc, regarding engineering development charge of PCB and cover.
A letter dated Nov. 30, 2001 from AVNAN Electro Inc, regarding Quotation for Switch Assembly and Cover-Speed Project.
A invoice dated Jun. 3, 2002 from AVNAN Electro Inc, regarding item MC-M4S-3, speed control switch assembly, and switch cover.
A purchase order dated Nov. 11, 2003, regarding the products bought from AVNAN Electro Inc.
A price list dated Jul. 1, 2003 from Les Industries Trovac Europe, regarding a plurality of product modules.
A instructions booklet dated Jun. 1, 2003 from Les Industries Trovac.
A instructions booklet dated 2003-2004 from CYCLOVAC.
An advertisment dated Sep. 9, 2003 from Les Industries Tovac.
A letter dated Jun. 25, 2003 from CYCLO VAC
A newsletter dated Sep. 2003 regarding CYCLO VAC hosts spring dealer meeting.
A newsletter dated Dec. 2003 regarding CYCLO VAC holds convention in France.
A flyer dated 2003 regarding specifications of different models.

(56) References Cited

OTHER PUBLICATIONS

A specification of MC-M4S-03 features dated Oct. 24, 2003.
A flyer dated 2003 regarding specifications of cyclo vac attachment sets.
A flyer dated 2003 regarding specifications of Cyclofiltre par Cyclo Vac.
An advertisement dated Jan. 2004 regarding Central Vac.

* cited by examiner

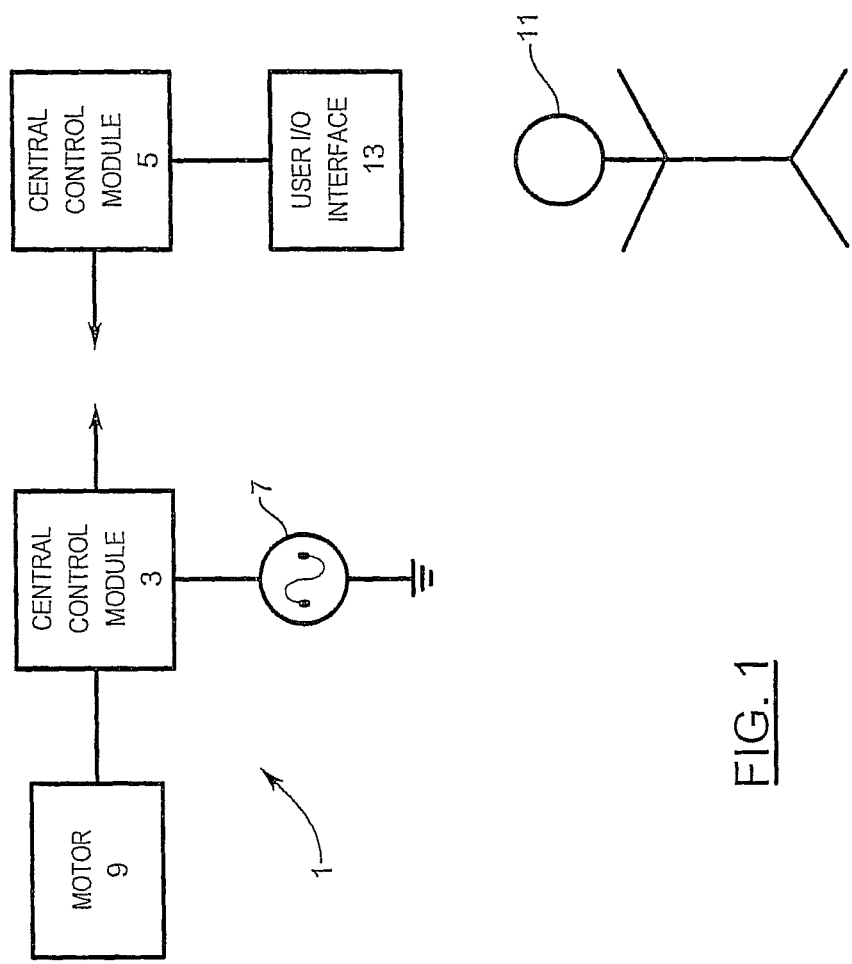

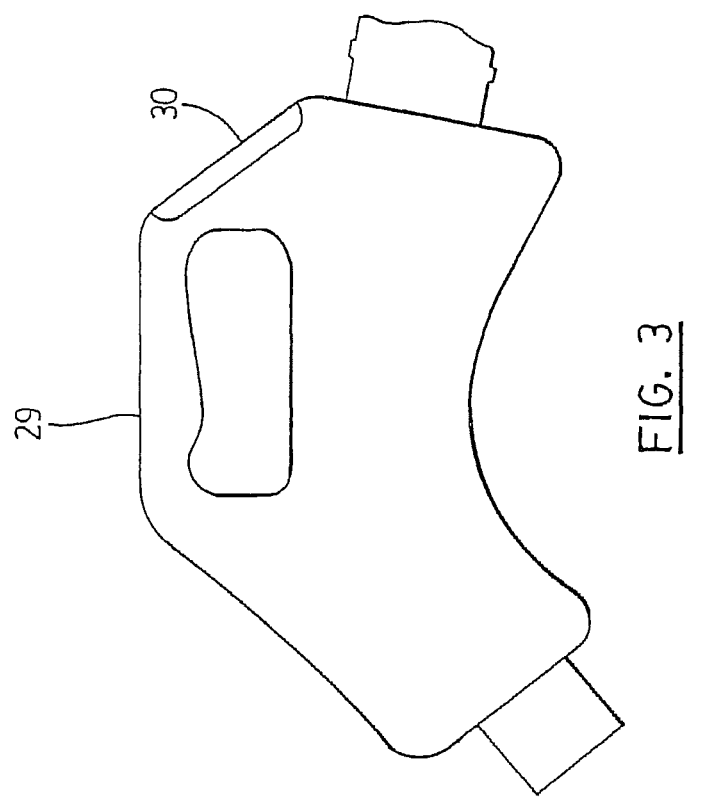
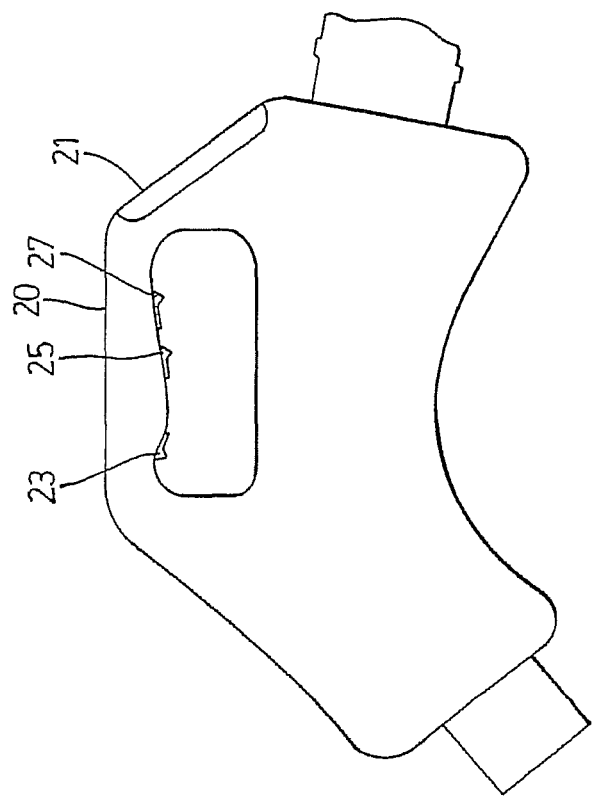

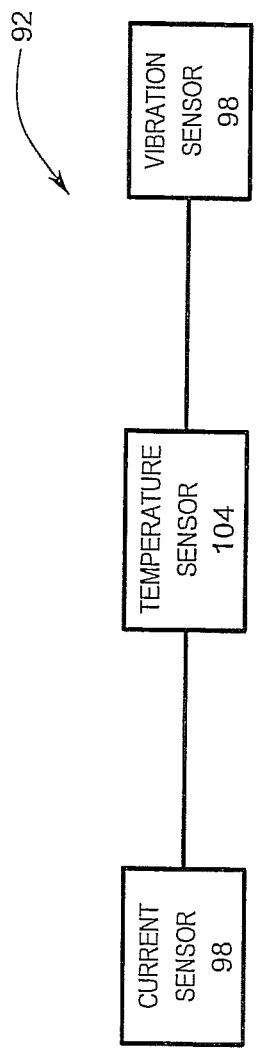
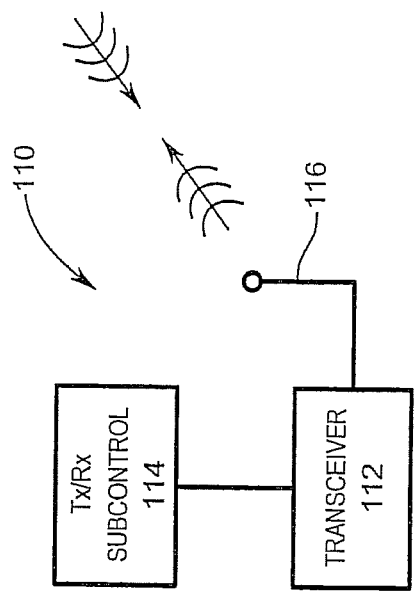
FIG. 12
FIG. 13

CENTRAL VACUUM CLEANING SYSTEM CONTROL SUBSYSTEMS

This application is a continuation of U.S. patent application Ser. No. 12/155,094 filed May 29, 2008, which is a continuation of U.S. patent application Ser. No. 10/936,699 filed Sep. 9, 2004, issued as U.S. Pat. No. 7,403,360, which is a continuation in part of U.S. patent application Ser. No. 10/843,321 filed 12 May 2004, issued as U.S. Pat. No. 6,856,113, and claims priority from, and the benefit of, the filing dates of the above applications. The contents of the above applications are hereby incorporated by reference into the Detailed Description hereof.

TECHNICAL FIELD

The invention relates to central vacuum cleaning systems. More particularly, it relates to control subsystems for central vacuum cleaning systems.

BACKGROUND ART

Many modern buildings have central vacuum cleaning systems. These systems have a suction motor to create a vacuum in a series of pipes through the building. A user of the system connects a flexible hose to one of the pipes. The hose has a handle for the user to grasp. The handle is further connected to one or more cleaning accessories.

The motor is housed in a motor housing that typically forms part of a central vacuum unit, often referred to as a "canister". The canister also has a receptacle portion for receiving dust and other particles picked up through the cleaning accessories and transported by the vacuum through the hose and pipes.

The canister is usually placed in a central location that is easily accessible for emptying the receptacle. The motor is typically powered by line voltage that is controlled by a motor control circuit in the motor housing.

Low voltage wires typically run beside, or form part of, the pipes and hose between the canister and the handle. This permits the user to control the motor by sending low voltage signals from the handle to the motor control circuit. In order to receive the low voltage signals, an opening is provided in the motor housing through which the low voltage wires can be connected to the motor control circuit.

Installation of the low voltage wires can involve a great deal of effort, particularly when the system is being installed in an existing building. It is known to use a hand held radio frequency remote control to control a central vacuum unit. It is known to transmit control signals through existing power lines in a building. Add-on remote control units for turning on and off a central vacuum unit are also known.

Improvements to, or alternatives for, existing central vacuum cleaning systems and central vacuum cleaning system control subsystems are desirable.

SUMMARY

According to an example embodiment, there is disclosed a central vacuum cleaning system comprising: a receptacle for receiving dirt; conduits terminating in valves to which a flexible hose may be attached; a motor for generating airflow through the conduits to the receptacle; a motor control circuit controlling power to the motor; and a remote module receiving, through a communications medium from the motor control circuit, signals indicating an operating condition of the central vacuum cleaning system.

According to another example embodiment, there is disclosed a microprocessor enabled wireless, portable control module for controlling a central vacuum cleaning system including: a transceiver for exchanging signals over a wireless communications medium; a screen for displaying information to a user regarding one or more operating conditions of the central vacuum cleaning system in dependence on signals received through the transceiver; and a user input interface for receiving user inputs and providing signals to the transceiver for transmission to the central vacuum cleaning system in dependence thereon.

According to another example embodiment, there is disclosed a central vacuum cleaning system including: a receptacle for receiving dirt; conduits terminating in valves to which a flexible hose may be attached; a motor for generating airflow through the conduits to the receptacle; a motor control circuit controlling power to the motor; a vacuum pressure sensor for sensing a vacuum pressure and providing a corresponding signal to the motor control circuit.

According to another example embodiment, there is disclosed a central vacuum cleaning system control subsystem for use in a central vacuum cleaning system having a suction motor, the subsystem including: a remote control module in the hose handle including a radio frequency wireless transmitter for transmitting command signals and including a radio frequency wireless receiver for wirelessly receiving messages from a central control module radio frequency wireless transmitter and including a user interface for providing to a user messages received by the remote control module radio frequency wireless receiver from the central vacuum source control module, and a central vacuum source control module including a radio frequency wireless receiver for wirelessly receiving command signals from the remote control module radio frequency wireless transmitter and including the central control module radio frequency wireless transmitter for wirelessly transmitting messages, the central control module also for controlling operation of the central vacuum cleaning system suction motor in accordance with the command signals. The central control module includes: i) at least one sensor, each sensor for sensing a respective operating condition of the motor, a current sensor of the at least one sensor for sensing motor current of the motor as the respective sensed operating condition for the current sensor; ii) at least one comparator, each comparator for determining when the motor is operating outside the corresponding normal operating condition for the motor for a given period of time; and iii) a performer for, when the comparator determines that the motor is operating outside the normal operating condition for the motor current, wirelessly transmitting messages related to the operating condition of the motor through the central control module radio frequency wireless transmitter to the remote control module radio frequency wireless receiver for provision to the user through the hose handle user interface.

According to another example embodiment, there is disclosed a central vacuum cleaning system comprising: a vacuum source including a motor within a motor housing; a receptacle extending from the motor housing for receiving dirt; a motor control circuit controlling power to the motor; valves to which a flexible hose may be connected; conduits connected to the vacuum source and terminating in the valves; a handle to be held by an operator, the hose terminating at the handle; a cleaning attachment connected to the handle, such that dirt is drawn by a vacuum created by the vacuum source through the attachment, handle, hose, and conduits; display means at a display location remote from the vacuum source and the motor control circuit; input means at an input location remote from the vacuum source and the motor control circuit, and duplex communication means to exchange control signals from the input means to the motor control circuit and to exchange from the motor control circuit to the display location one or more messages regarding the status of the system, such messages to drive the display means for communication with an operator.

According to another example embodiment, there is disclosed a central vacuum cleaning system comprising: a vacuum source including a motor within a motor housing; a receptacle extending from the motor housing for receiving dirt; a motor control circuit including a microprocessor and a triac, and the microprocessor controls the triac to control power to the motor; conduits connected to the vacuum source and terminating in the valves; handle to be held by an operator, the hose terminating at the handle; and a cleaning attachment connected to the handle, such that dirt is drawn by a vacuum created by the vacuum source through the attachment, handle, hose, and conduits.

According to another example embodiment, there is disclosed a central vacuum cleaning system including a vacuum source including a motor within a motor housing; a receptacle extending from the motor housing for receiving dirt; a motor control circuit controlling power to the motor; valves to which a flexible hose may be connected; conduits connected to the vacuum source and terminating in the valves; a handle to be held by an operator, the hose terminating at the handle; a cleaning attachment connected to the handle, such that dirt is drawn by a vacuum created by the vacuum source through the attachment, handle, hose, and conduits, and display means to provide one or more messages to a user regarding the status of the system.

According to another example embodiment, there is disclosed a hose assembly comprising a flexible hose having a first end and a second end, said first end having a handle assembly with a nozzle, said second end having a connection means removably securing said hose to a vacuum source, said handle assembly having a means for transmitting a radio frequency signal to said vacuum source, said radio frequency signal being capable of activating the vacuum source so that a vacuum is present at an end of said nozzle.

According to another example embodiment, there is disclosed a central vacuum cleaning system control subsystem for use in a central vacuum cleaning system having a suction motor, the subsystem comprising a central vacuum source control module for controlling a central vacuum cleaning system suction motor, the module including: a) at least one sensor, each sensor for sensing a respective operating condition of the motor, a current sensor of the at least one sensor for sensing motor current of the motor as the respective sensed operating condition for the current sensor; b) at least one comparator, including a comparator for the sensed motor current to a corresponding normal operating condition motor current, the at least one comparator for comparing each sensed operating condition of the at least one sensed operating condition to a corresponding normal operating condition for that sensed operating condition of the motor and for determining when the motor is operating outside at least one corresponding normal operating condition for the motor for a given period of time; and c) a performer for, when the comparator determines that the motor is operating outside the normal operating condition for the motor current, performing at least one action, the action comprising transmitting a message to a remote module to generate a user alert at the remote module.

According to another example embodiment, there is disclosed a method of controlling a central vacuum cleaning system suction motor, the method including: a) sensing at least one operating condition of the motor, such at least one operating condition including the motor current; b) comparing each sensed operating condition to a corresponding normal operating condition for that sensed operating condition of the motor; c) determining when the motor is operating outside at least one normal operating condition for the motor for a given period of time; and d) when it is determined that the motor is operating outside the normal operating condition for the motor current, performing at least one action, wherein the action includes providing a message to a user in a location remote from the motor that the cleaning system is operating outside normal operating conditions.

According to another example embodiment, there is disclosed a device in a vacuum cleaning system, the device including: a) an impeller, and b) a generator, wherein the impeller is located such that air moving though the cleaning system during use causes the impeller to turn, and wherein turning of the impeller causes the generator to generate electrical energy.

In other aspects the invention provides methods of carrying out, components for, and systems using the other aspects of the invention as described above, and still further aspects based on the detailed description herein.

BRIEF DESCRIPTION OF THE DRAWINGS

For a better understanding of the present invention and to show more clearly how it may be carried into effect, reference will now be made, by way of example, to the accompanying drawings that show the preferred embodiment of the present invention and in which:

FIG. 1 is a schematic diagram of a central vacuum cleaning system control subsystem in accordance with the preferred embodiment of the present invention;

FIG. 2 is a side view of a central vacuum cleaning system hose handle for use with the subsystem of FIG. 1;

FIG. 3 is a side view of an alternate central vacuum cleaning system hose handle for use with the subsystem of FIG. 1;

FIG. 12 is a block diagram of a central operating condition sensors for use in the central operating condition submodule of FIG. 11;

FIG. 13 is a block diagram of a remote transceiver submodule for use in the subsystem of FIG. 1;

MODE(S) FOR CARRYING OUT THE INVENTION

Figure 5:
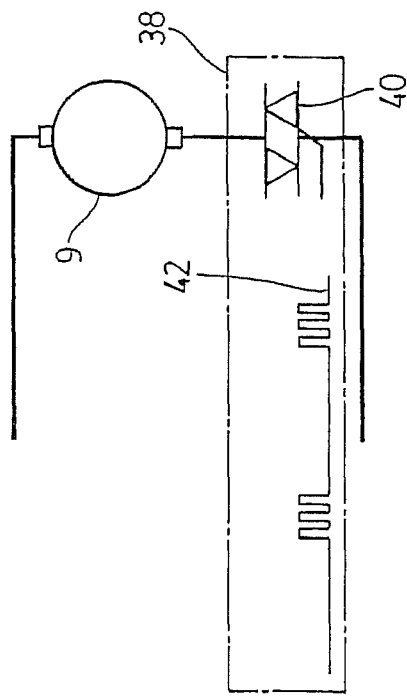
FIG. 5 is a schematic diagram of a power stage for use in the subsystem of FIG. 1.

Referring to FIG. 1, a central vacuum cleaning system control subsystem 1 has a central control module 3 and a remote control module 5.

The central control module 3 controls power from a power source 7 to a motor 9, and by doing so the central control module 3 controls the operation of the motor 9. The power source 7 is typically line voltage, for example, 120V or 240V, 60 Hz AC in North America or 230V, 50 Hz AC in Europe.

The remote control module 5 is connected to a user input/output interface 13. The remote control module 5 receives input from a user 11 through the interface 13. User input may be as simple as a request for a change of state of the motor 9 where the interface 13 would be a toggle switch 13.

The remote control module 5 is a wireless transmitter. It encodes the input received from the user for wireless transmission to the central control module 3 as indicated by the arcs 15. The central control module 3 is a wireless receiver. It receives the wireless transmission from the remote control module 5, decodes it and controls the motor 9 accordingly. For example, if the user requests the motor 9 to change state then if the central control module 3 is providing power from the source 7 to the motor 9 then the central control module 3 will cease doing so. If the central control module 3 is not providing power from the source 7 to the motor 9 then it will provide power.

The central control module 3 is also a wireless transmitter. The central control module 3 senses the operating condition of the motor 9, encodes a message related to the condition and wirelessly transmits the message to the remote control module 5 as indicated by the arcs 17. The message is received by the remote control module 5, decoded, and provided to the user through the interface 13.

Referring to FIG. 2, a hose handle 20 incorporates the interface 13 as a display means 21 and switch 23. A toggle switch 23 is shown in the FIGS.; however, various types of switches, such as for example a momentary switch, not shown, could be used. The display means 21 may take the form of one or more lights, such as LEDs and/or an LCD screen with icons. Alternatively, or in addition, the display means may have a speaker or buzzer to provide sound output to the user by way of voice or an alarm. A transducer may be used to create sounds. This provides bi-directional communication between the central control module 3 and the remote control module 5, and thereby provides bidirectional communication between the user 11 and the motor 9 as will be discussed further herein.

In a preferred embodiment, the central control module 3 is able to provide more complex control of the motor 9 beyond simply turning it on and off. For example, the central control module 3 may be able to adjust the speed at which the motor 9 operates. There are many different techniques for adjusting motor 9 speed, some of which are dependent on the type of motor 9.

For example, existing central vacuum cleaning systems typically use a universal motor 9. The speed of a universal motor 9 can be controlled by reducing the voltage applied to the motor 9. DC motors 9 have also been described for use as vacuum motors 9, see for example, co-pending PCT Patent Application No. PCT/CA03/00382 filed 12 Mar. 2003, published 18 Sep. 2003 as WO03075733A1. The speed of a DC motor 9 can be adjusted by adjusting the voltage for a series wound motor 9, or by controlling the excitation on the armature of a shunt wound motor 9.

Where the central control module 3 has the ability to control motor 9 speed then it may be desirable to provide for a "soft start". This can be done by starting the motor 9 at a slower desired speed and working up to a higher speed. This can increase the longevity of the motor 9, particularly for universal motors 9 where starting can result in a high inrush current that has a cumulative detrimental effect on motor 9 windings over time. Soft start control can be configured as an internal setting of the central control module 3 without requiring external user input.

The user 11 can be permitted to adjust the speed of the motor 9 on demand by requesting such an adjustment through the user input/output interface 13. This can be done by providing additional user inputs at the interface 13, for example more switches 25, 27, or it may be more effectively done by interpreting the signals from the user 11 through a lesser number of inputs, for example switch 23 only. For example, the switch 23 can be actuated to signal a particular request. A series of switch 23 actuations may signal a request for a decrease motor 9 speed another series of switch 23 actuations may signal a request for an increase in motor 9 speed. Another signal would indicate on and another off.

An easier interface 13 for the user 11 would include two switches 23, 25. Repeated actuation of one switch 23 signals a request for an increase in speed, while repeated actuation of the other switch 25 signals a request for a decrease in speed. A single actuation of one switch 23 could indicate a request to turn the motor 9 on, while a single actuation of the other switch 25 could indicate a request to turn the motor 9 off. For example, each request for a decrease in speed could result in a 10% reduction to a maximum of a 50% reduction. Rather than incrementally increasing speed, the user could be required to request the motor 9 to be turned off and then on through the interface 13. This could reset the speed to 100%.

Figure 4:
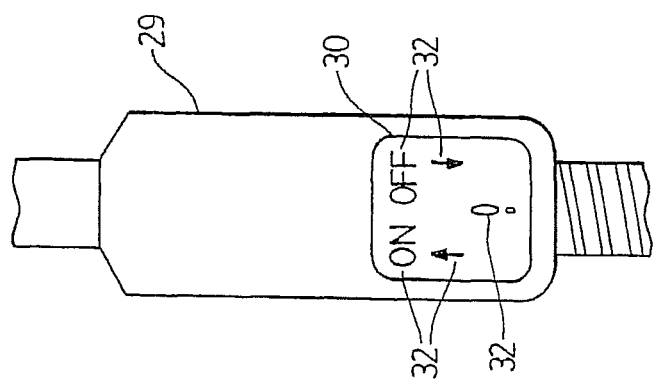
FIG. 4 is a plan view of the handle of FIG. 3.

More switches or input devices, not shown, could be added as desired. Referring to FIGS. 3 and 4, an alternative interface 13 might be a touch screen 30 that could incorporate both a display and input device. The touch screen could display various icons or text representing messages from the central control module 3 regarding the operating condition of the motor 9. Icons or text could also be provided to allow the user 11 to send messages to the central control module 3 by touching the icons or text.

Many power stages can be used to decrease (and to increase) the voltage to the motor 9. Referring to FIG. 5, the preferred embodiment of a power stage 38 (shown in dashed lines) is to use a solid-state controller, such as a triac 40. A triac 40 can be easily controlled using other solid-state components such as, for example, a microprocessor or a microcontroller, not shown in FIG. 5, but an example will be later described. The triac 40 can be driven by a gate signal 42 (for example, from the microprocessor or microcontroller) that is phase shifted depending on the effective voltage desired. This is known as a phase-angle drive. At a minimum it requires only a gate driving signal 42 and a single additional component: the triac 40.

In this description the term "solid-state" will be used to describe components that have no moving parts. Solid-state components can be integrated circuits, such as microprocessor, or discrete components such as a single capacitor or resistor.

Figure 6:
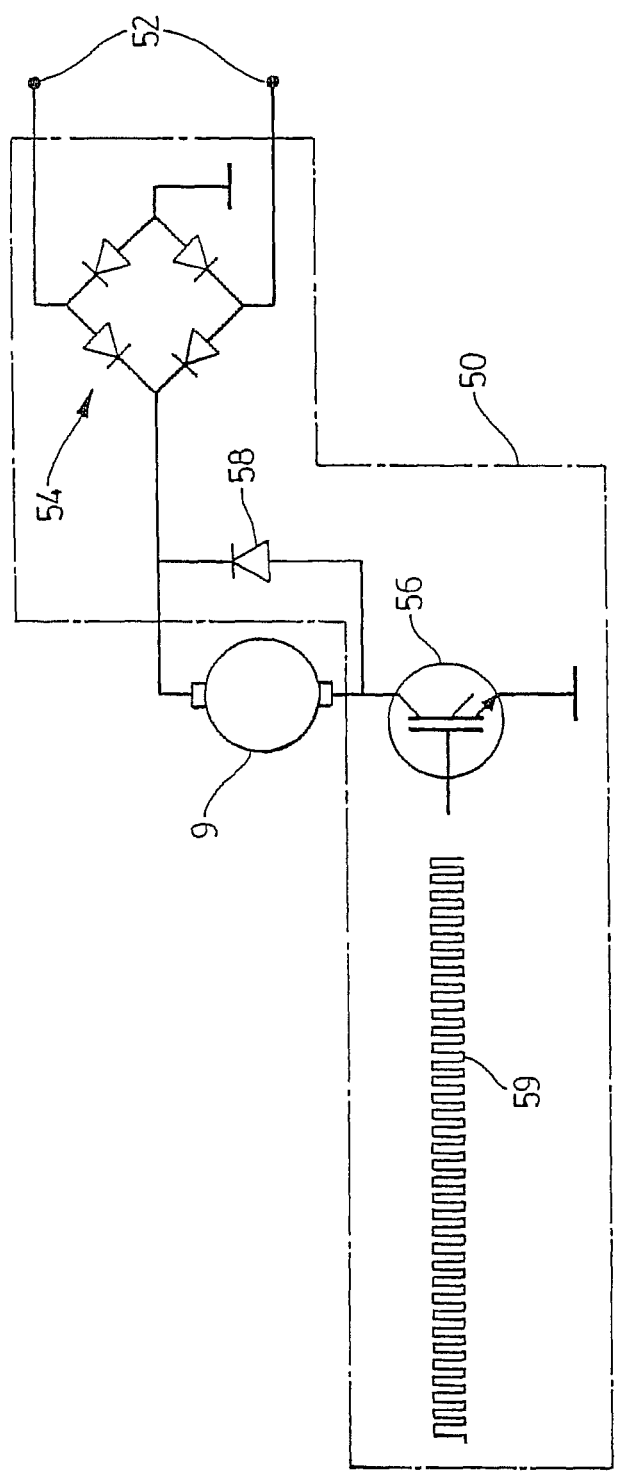
FIG. 6 is a schematic diagram of an alternate power stage for use in the subsystem of FIG. 1.

Referring to FIG. 6, a more complex power stage 50 (shown in dashed lines) may be used to control the voltage from voltage source inputs 52 seen by the motor 9 using, for example, an input rectifier 54, a power switch (transistor) 56 and a diode 58. This uses a Pulse Width Modulation gate drive signal 59 to adjust the effective voltage seen by the motor 9 to be varied. This is known as a chopper drive. It is still a solid-state device without mechanical components, such as those mechanical components that are used in some relays and circuit breakers that are typically found in existing central vacuum units.

Figure 7:
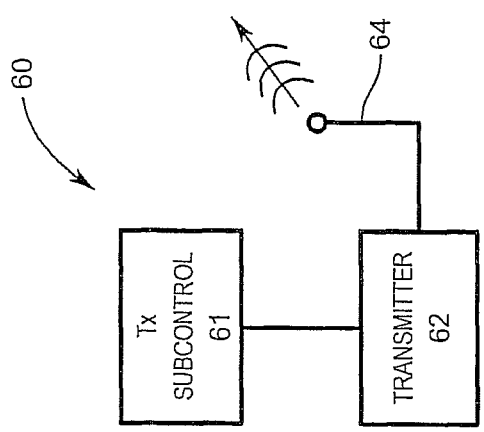
FIG. 7 is a block diagram of a central transmitter submodule for use in the subsystem of FIG. 1.

The central control module 3 also has a number of submodules that operate based on a variety of sensed conditions. Referring to FIG. 7, central transmit submodule 60 has a transmit (Tx) subcontrol 61, a wireless transmitter 62 and an antenna 64. The Tx subcontrol 61 encodes messages to be transmitted wirelessly by transmitter 62 through the antenna 64.

Figure 9:
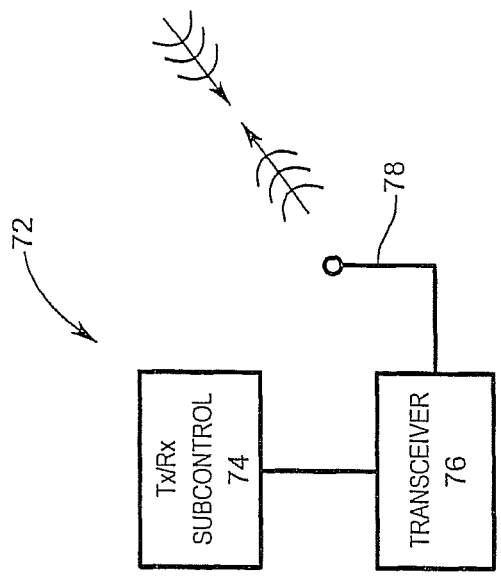
FIG. 9 is a block diagram of a central transceiver submodule for use in the subsystem of FIG. 1.
Figure 8:
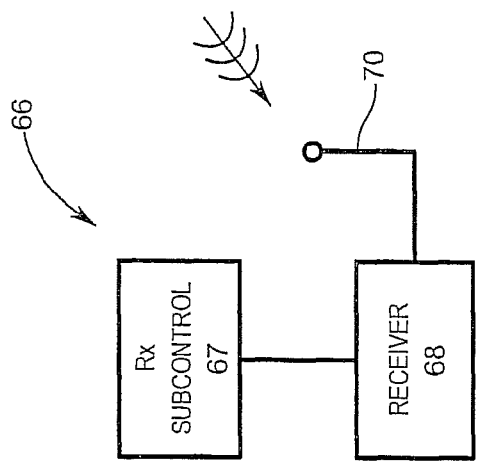
FIG. 8 is a block diagram of a central receive submodule for use in the subsystem of FIG. 1.

Referring to FIG. 8, a central receive submodule 66 has a receiver (Rx) subcontrol 67, wireless receiver 68 and an antenna 70. The Rx subcontrol 67 decodes messages received by the receiver 68 through the antenna 70. The antenna 64 and 70 may be one in the same component if desired, and designed for, by the designer in a manner that would be evident to those skilled in the art. If the Referring to FIG. 9, the central transmit submodule 60 and central receive submodule 66 may be replaced by a central transceiver submodule 72 having a transmit/receive (Tx/Rx) subcontrol 74, a transceiver 76 and an antenna 78. The submodule 72 encodes and decodes, transmits and receives messages through antenna 78 in a manner similar to the central transmit submodule 60 and the central receive submodule 66, combined.

The wireless transceiver 76 combines a transmitter and receiver in a single component. Among other benefits, the use of an integrated transceiver 76 can reduce complexity, power consumption and size. Also, transceiver for unlicensed short distance communication typically utilize higher frequencies for less interference and more effective communication.

This description will be made primarily with reference to a central transceiver submodule, such as submodule 72. It is to be understood that discrete transmit submodules, such as submodule 60, and discrete receive submodules, such as submodule 66, could be used as necessary for a particular application, if desired.

Figure 10:
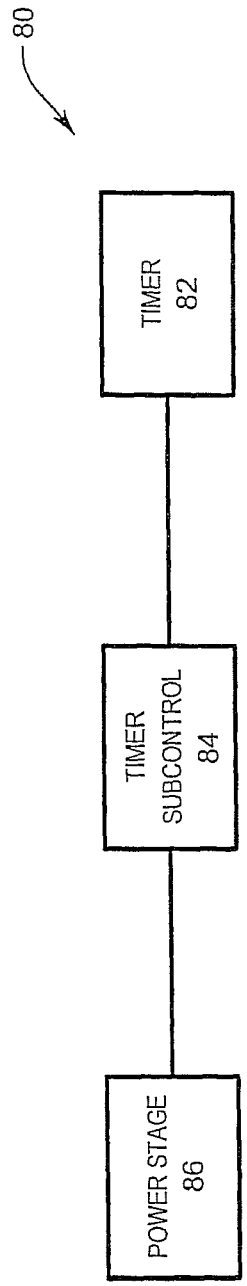
FIG. 10 is a block diagram of a central timer submodule for use in the subsystem of FIG. 1.

Referring to FIG. 10, the central control module 3 has a timer submodule 80 with a timer 82, a timer subcontrol 84 and a power stage 86. The timer 82 commences timing on the instruction of the subcontrol 84 when the power stage 86 powers on the motor 9. If the timer 82 times more than a predetermined amount of time then the timer subcontrol 84 instructs the power stage 86 to stop providing power to the motor 9. For example, if the motor 9 has been running for 30 minutes then the timer submodule 80 shuts off the motor 9. This safeguards against inadvertent operation of the motor 9. If a user 11 wishes to continue use then the user 11 simply activates the motor 9 through the interface 13, and the timer submodule 80 starts timing again.

The timer submodule 80 is also connected to the central transceiver submodule 72 for transmission of messages to the remote control module 5.

Figure 11:
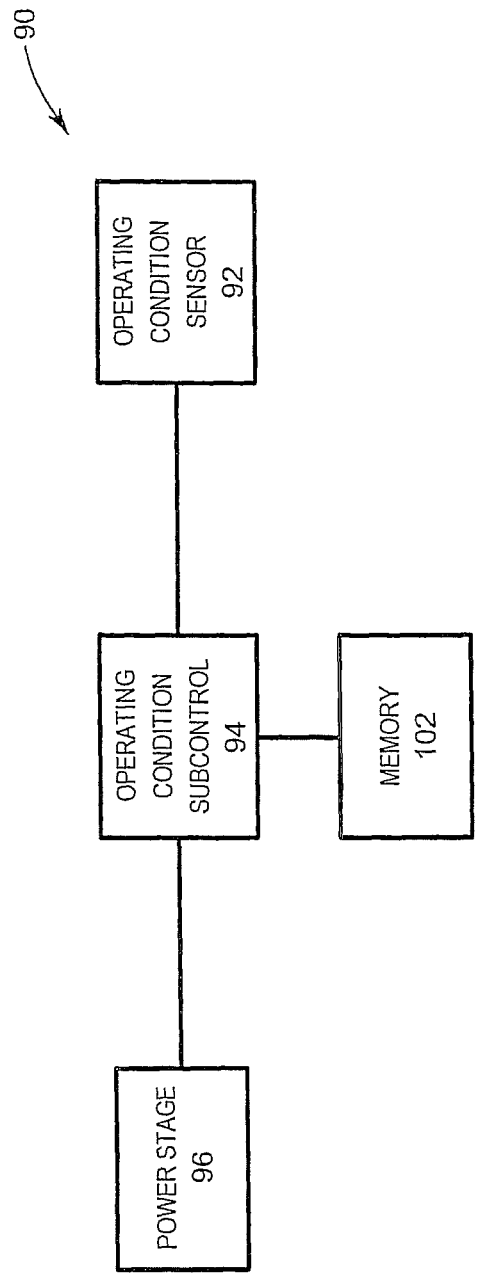
FIG. 11 is a block diagram of a central operating condition submodule for use in the subsystem of FIG. 1.

Referring to FIG. 11, the central control module 3 has an operating condition submodule 90 with one or more operating condition sensors 92, an operating condition subcontrol 94 and a power stage 96. The operating condition 92 senses various operating conditions of the motor 9 under the control of the operating condition subcontrol 94. According to the sensed operating conditions, the operating condition subcontrol 94 controls the power stage 96 by, for example, providing gate drive signals. The operating condition submodule 90 is also connected to the central transceiver submodule 72 for transmission of messages to the remote control module 5.

Thus, the central control module 3 senses an operating condition of the motor 9, compares it to a normal operating condition of the motor 9 (examples of which will be described), determines if the motor 9 is operating outside a normal operating condition, and performs an action if the motor 9 is operating outside the normal operating condition. Examples of various sensors will be described herein; also, an example microprocessor embodiment for comparing, determining and performing will be described. An example of a performer for performing an action is the subcontrol 94 described above that controls the power stage 96 after determination. In this case, the subcontrol 94 carries out the comparison and determination, and performs the action. Other example performances of actions will be described herein.

Referring to FIG. 12, one of the operating condition sensors 92 may be a current sensor 98 for sensing the motor 9 operating current. If there is an overcurrent condition then the central control module 3 will disconnect power from the motor 9 by having the operating condition subcontrol 94 instruct the power stage to stop providing power 96 to the motor 9. Overcurrent might be determined by a current that is more than a given amount above the normal operating current of the motor 9. In the preferred embodiment an overcurrent condition is a current of more than 100% above (twice) the normal operating current where such current is present for over 3 seconds. Such a condition is indicative of something jammed in an impeller or other suction creating device, not shown, attached to the motor 9, and the motor 9 is working to overcome the obstruction. The actual thresholds used will depend on the particular specifications for the motor 9 used in any particular application. After an overcurrent condition occurs, it is best to require disconnection of a source of power from the central control module 3 before the motor 9 can be restarted. This is a safety feature. An overcurrent condition can require maintenance. If it occurs repeatedly then the user will likely make a call for service rather than repeatedly disconnect and re-connect the power source.

Referring to FIG. 11, in order to provide specifications on which a threshold can be based the central control module 3 can have a non-volatile memory 102 in which the specifications can be stored. The specifications can be sensed during normal operating condition of the motor 9 and stored.

Such condition may be represented by the current drawn by the motor 9. This can easily be sensed by the operating condition sensor 92 under control of the operating condition subcontrol 94.

The normal operating condition of the motor 9 could also be input directly by the user 11 at the interface 13 and transmitted from the remote control module 5 for reception at the transceiver 72, decoding by the transceiver subcontrol 74 and storage in memory 102. The memory 102 is a rewriteable device such as, for example, an EEPROM, EPROM or flash memory device. Alternatively, the normal operating condition can be pre-configured in memory 102 by an installer, or at the time of manufacture. If the normal operating conditions are input at the time of manufacture or installation then a write once memory device, such as a PROM, could be used, if desired.

As the central control module 3 may be used with many different motors 9, and the design specifications and operating environment of each motor 9 may change from time, it is preferable simply to allow the central control module 3 to sense automatically (i.e. without requiring data to be input by a user 11, manufacturer or installer) the normal operating condition when the central control module 3 is installed.

The central control module 3 will need to be configured to ignore any inrush current each time the motor 9 is turned on if the inrush current would exceed the threshold amount and duration. A soft-start configuration as described previously can be used to reduce inrush current. The soft start can be implemented through motor 9 control using, for example, one of the power stages 38, 50.

The current sensor 98 may be a current sensing transformer, current sensing resistor or other similar or alternative device in line with, or integrated into, the power stage (for example, 38, 50) or elsewhere in the central control module 3.

The central control module 3 operating condition submodule 90 can also sense an undercurrent condition of the motor 9. This typically signifies a blockage in an air inlet to the motor 9. Such a blockage stops air flow, resulting in free spinning of the motor 9 and a reduction in load on the motor 9. If this condition persists for longer than a predetermined period then the central control module 3 can automatically disconnect power to the motor 9. Also or alternatively, notice could be provided to the user 11. As an example, the predetermined period could be set for approximately 15 minutes. The period should be long enough to allow the user to remove typical blockages, while not so long as to continue operation on an ongoing basis in an underperforming condition.

Referring again to FIG. 12, the operating condition sensors 92 may also include a temperature sensor 104 that monitors the temperature around the motor 9. An over temperature condition can be detected in comparison to normal operating temperature stored in memory 102. The central control module 3 under control of the operating condition submodule 90 ceases to provide power to the motor 9 when an over temperature condition occurs. To again use the motor 9, a source of power to the vacuum source 205 of FIGS. 15 and 16 must be disconnected (for example by unplugging the power to the vacuum source 205) from the central control module 3 by the user 11, and reconnected. Additionally, the overtemperature condition must have cleared. Again, this is a safety feature. Repeated overtemperature conditions may indicate that maintenance is required.

The memory 102 may also store the normal operating temperature (or other representation on which a threshold may be based) input, for example, in the manner described for the normal operating current, except possibly using the temperature sensor 104 to sense normal operating temperature.

An accelerometer or other vibration or motion sensor 106 can be incorporated into the central control module 3 to sense for vibration. Unusual ongoing vibrations can be an indication that the balance of the motor 9 is off, and the motor 9 may be starting to fail. The normal and current conditions can be sensed with the normal condition being stored in memory 102 for future comparison.

The central control module 3 can be used in association with an autodialer to provide information about the cleaning system to a remote location through telephone lines. Contact could be made as a result of a sensed condition or the passage of time. The central control module 3 could also receive a remote call for diagnostic purposes. Referring to FIG. 13, remote control module 5 incorporates a remote transceiver submodule 110 similar to that of the central transceiver submodule 72, including a remote transceiver 112, remote transceiver subcontrol 114, and antenna 116. The operation of the remote transceiver submodule 110 and central transceiver submodule 72 are similar and will not be repeated. It is to be noted that the functions of the remote transceiver submodule 110 could be replace by a separate transmitter submodule and/or receiver submodule, not shown.

In the preferred embodiment, the transceiver submodules 72, 110 of central control module 3 and remote control module 5, respectively, are matched for transmission and reception of signals over a distance of approximately 150 ft. through typical residential obstacles and building materials. The design distance is a matter of choice, governed by applicable legal requirements such as might apply to signal strength and frequency. A digitally modulated radio frequency (r.f.) carrier of 433.92 MHz is suitable as it meets current North American and European requirements for r.f. control systems.

Alternatively, r.f. transmissions can operate in spread-spectrum mode. This could include frequency hopping spread spectrum or direct-sequence spread spectrum (DSS). These techniques enable operation at higher r.f. power levels than single frequency operation by distributing the power over a number of different frequency channels. In this case, the carrier frequency could be in the 850-950 MHz or 2.4 GHz bands to comply with legal requirements in North America and Europe. In this case, design for a minimum distance of approximately 300 ft. between central control module 3 and remote control module 5 is preferred.

Other r.f. transmission techniques and frequencies could be used as desired for particular applications.

A microprocessor can be used as the transceiver subcontrol 114 in the remote control module 5 to provide the digital encoding of r.f. carrier with message data, and to decode messages received from the central control module 3. Other devices such as a microcontroller or discrete components could be used to perform these functions.

Wireless communication provides a significant advantage. Wired low voltage signals require a step down transformer from line voltage to low voltage, such as a class II safety transformer. Wireless communication obviates the need for low voltage signals and the class II transformer for that purpose.

The central control module 3 can be powered using a drop down resistor or capacitor from the power source 9. A non-class II transformer can be used in the event that larger power is required as wireless communication does not require the use of a class II transformer. It may still be desired to use a class II transformer in order to allow a manufacturer to provide an option to communicate via low voltage wires connected between the central control module 3 and the remote control module 5. The selection between wired and wireless communication can be made at the time of manufacture, or the manufacturer can leave this selection up to the installer. If the selection is made by the manufacturer than separate different central control modules and remote control modules can be made for wired and wireless configurations.

It is to be understood that wireless communication is not required for all of the functions described herein. In fact, for many functions it is not necessary to have communication between the user 11 and the central vacuum source 205, except to turn the motor 9 on and off. The other functions can operate without user intervention; however, this is not the preferred embodiment.

In order to meet regulatory requirements a circuit breaker is typically used to limit current. The circuit breaker uses a bimetallic strip. The bimetallic strip is sensitive to ambient temperature and results in nuisance tripping of the circuit breaker when operated in high ambient temperatures. By using a current sensing resistor or transformer as the current sensor 98 to sense an overcurrent condition, a microprocessor can be used as the operating condition subcontrol 94 to turn off a triac in a power stage, or activate a relay in a power stage, to control current to the motor 9 to shutdown the motor 9. This protects the motor 9. In some cases, a triac can fail in such a way that current would not be shut off to the motor 9. It may be preferable to include a redundant overcurrent protection device for otherwise catastrophic failure, such as a trace on a printed circuit board for the central control module 3 of a size to act as a fuse on the load (motor 9) side, opening in the event of a sustained overcurrent condition and preventing current from flowing to the motor 9. Other redundant overcurrent protection devices could be used.

Figure 14:
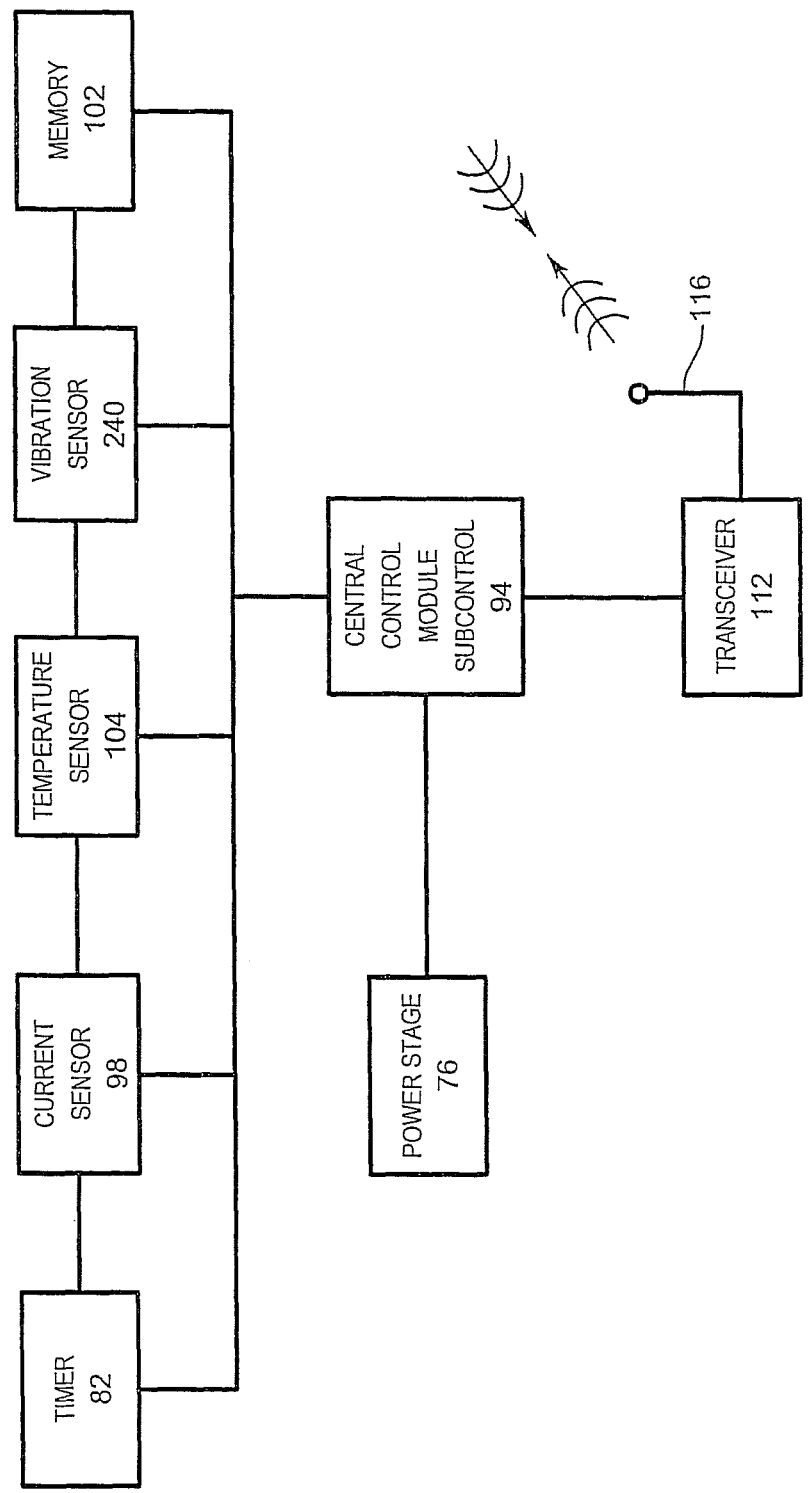
FIG. 14 is a detailed block diagram of a central control submodule for use in the subsystem of FIG. 1.

Referring to FIG. 14, the various submodules of the central control module 3 can be combined. In combining the submodules, the various subcontrols can also be combined into a single central control subcontrol 160 which can utilize a single microprocessor, microcontroller or combination of discrete components, to perform the functions described herein for each of the submodules. The memory 102 can be part of the microprocessor or microcontroller, or it may itself be a discrete component. Preferably, the central control subcontrol is a microprocessor with integrated memory 102. The entire timer submodule may be part of the microprocessor, or it may be a combination of the microprocessor and a few discrete components to set the proper timing for the timer. Alternatively, the timer may comprise components discrete from the microprocessor.

The various subcontrols, microprocessor and microcontroller are programmed to perform the functions described herein. The programs are contained in a non-volatile memory, such as memory 102, or an internal memory within the subcontrol, microprocessor or microcontroller.

Figure 15:
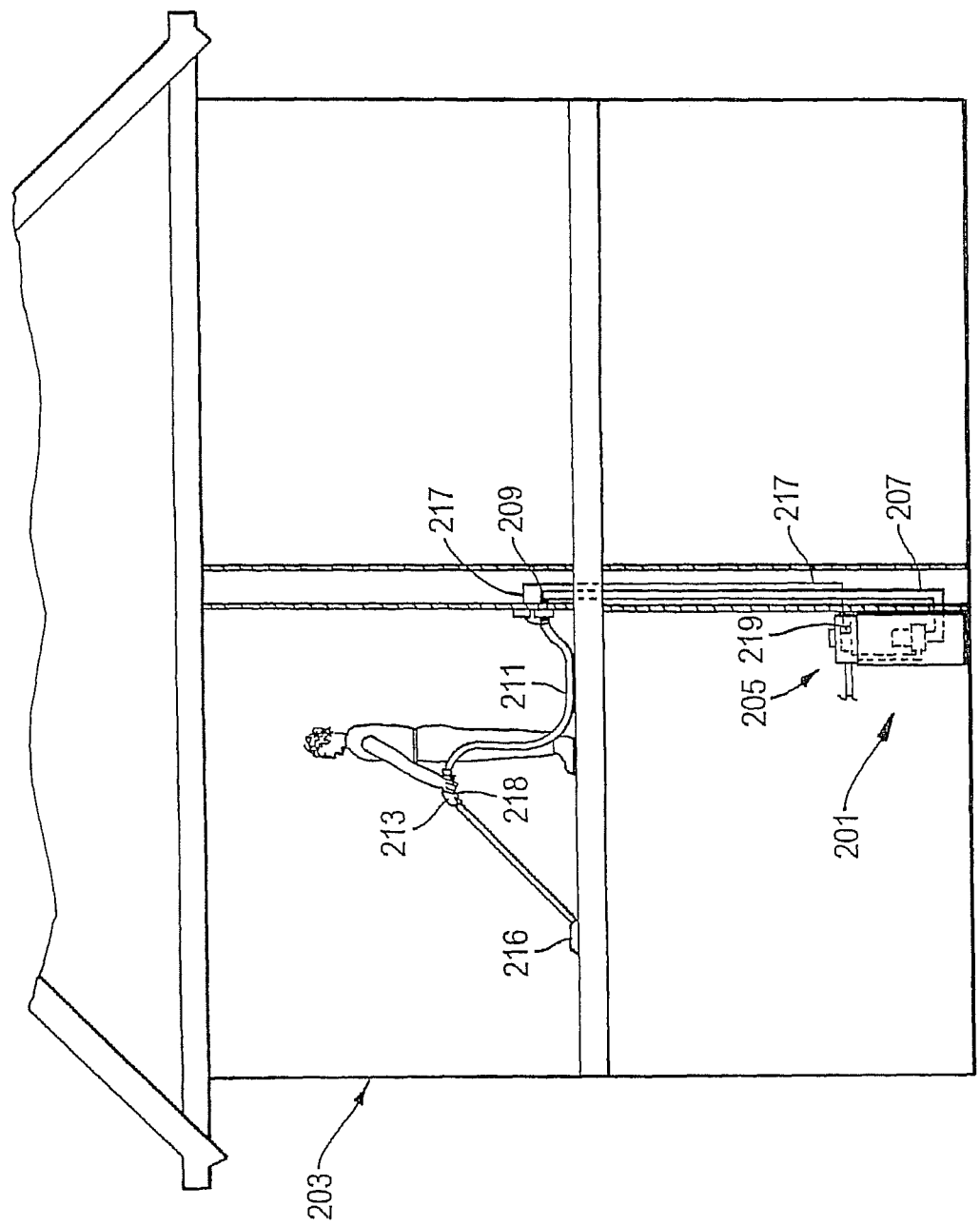
FIG. 15 is a side cross-section of a building incorporating a central vacuum cleaning system using an embodiment of the subsystem of FIG. 1.

Referring to FIG. 15, a central vacuum cleaning system (indicated generally at 201) incorporates a control subsystem 1 in the form of central control module 3 and remote control module 5 as will be further described. The system 201 is installed in a building 203. The building 203 is shown as a residence; however, the system 201 could be installed in other buildings, such as commercial or industrial buildings.

The system 201 has a vacuum source 205 in a central location. The source 205 is connected through pipes 207 or other conduits in walls, floors or ceilings of the building 203. Alternatively, the pipes 207 may be exposed. The pipes 207 terminate at valves 209 to which a flexible hose 211 may be connected. The hose 211 terminates in a handle 213 that is held by user 11. Various cleaning attachments, such as a carpet brush 216, are connected to the handle 213.

Control signals, such as ON/OFF, from the user 11 are provided through a switch 218 (or switches 218 or some other interface 13 in the handle 213. More sophisticated systems 201 may utilize the control signals for many other purposes, such as duplex communications that allow the receipt of information at the handle 213. Such information could be used to drive LEDs or other display means 219 (as described previously for the interface 13) for communication with the user 11. When the user 11 turns on the system 201, dirt is drawn by a vacuum created by the vacuum source 205 through the attachment 216, handle 213, hose 211, and pipes 207.

Figure 16:
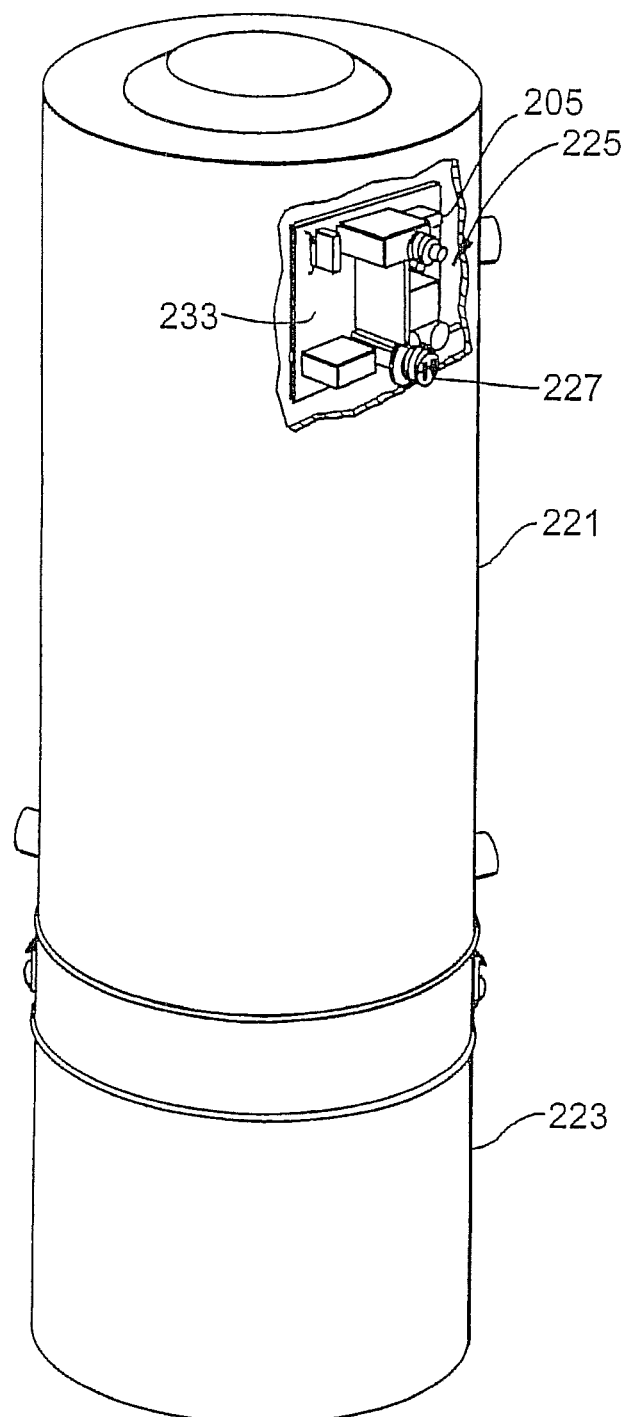
FIG. 16 is a cut-away perspective view of a vacuum source for use in the cleaning system of FIG. 15 incorporating an embodiment of the subsystem of FIG. 15.

Referring to FIG. 16, the vacuum source 205 has a motor 9 (FIG. 1) within a motor housing 221. Extending from the motor housing 221 is, typically, a receptacle 223 for receiving the dirt. Also within the motor housing 221 is a motor control circuit 225 embodying central control module 3 of FIG. 1. In the preferred embodiment, the motor housing 221 also acts as a motor control housing 221. Accordingly, the motor housing 221 will be referred to as a motor control housing herein, unless the context requires otherwise. It is to be understood that the motor housing and motor control housing could be separate from one another.

Preferably, the central control module 3 (including its transceiver 74) is placed within the motor control housing 221. Alternatively, the central control module 3 could be distributed with the transceiver 74 portion outside the motor housing 221 to avoid interference and signal attenuation.

The motor control circuit 225 is typically laid out on a printed circuit board 233, including all of the components to implement the functions of the central control module 3. Multiple printed circuit boards or separately mounted components may be used as desired.

The motor control circuit 225 can be mounted in many different ways, for example on mounting screws or posts, not shown, inside or outside the motor control housing. It may be preferable to mount the motor control circuit 225 in the cooling air inlet passage or outtake (exhaust) of the motor 9 to provide cooling for the circuit 225. Any power stage of the circuit 225, in particular, may benefit from such cooling.

Although the preferred embodiment is being described with reference to a motor control circuit 225 for mounting inside a motor housing 221, as mentioned previously, the circuit 225 need not be mounted inside the motor housing 221. For example, the circuit 225 could be mounted within a control box, not shown, outside the housing 221 with wires fed back into the housing 221 for operation of the motor 9. This might be done for additional isolation of the control circuit 225 from the motor 9. For example, it might be helpful to avoid electromagnetic interference from the motor 9. The control box would be an alternate form of motor control housing 221. As mentioned previously, for this reason, the motor housing 221 is being referred to as a motor control housing 221 in this description, unless the context requires otherwise.

In the preferred embodiment, the central control module 3 also has means for communication with the user 11. In the preferred embodiment, display means 75 takes the form of an LED, not shown, within a translucent mounting post 227.

The motor control circuit 225 has optional wired and wireless communication paths. Accordingly, the pointing post accepts connections from low voltage wires as described in the U.S. patent application referenced in the Cross-Reference to Related Applications section hereof. As an alternative display example, the LED could extend through the housing 221 for direct viewing.

LEDs are a preferred choice as LEDs are long lasting, small, inexpensive, and low power devices. Higher power LEDs, LEDs of different colours, multi-colour LEDs, and LEDs of different shapes and sizes may all be used. Standard LED packages such as a T-1 or T-1¾ can be used. These tend to be the least expensive. This allows for LEDs of more than 3000 mcd, for example 3200 mcd and 4500 mcd in green. These are examples only and many other sizes and configurations can be used. For example, a multi-colour LED could be used to provide many possible signalling combinations, such as a red/yellow LED that can provide red solid, red flashing, yellow solid, yellow flashing, orange solid, and orange flashing. Also, single colour LEDs can be chosen from a wide variety of colours, including green, yellow, red, white and blue, among others.

The messages provided to the user 11 by the LEDs might include, for example, 1) informing the user that electrical power is present and the system 1 has no apparent problems (LED GREEN), 2) air flow is obstructed, check for obstructions, including in the pipes 207, in the flexible hose 211 or the filter medium, or the dust receptacle 223 is full and should be emptied (LED YELLOW), 3) a sensor indicates that service to the system 201 is needed, for example, an overcurrent condition shutdown that may indicate a problem such as bearing failure (LED flashes RED), and 4 a certain amount of time has passed indicating that service to the system 201 is needed, for example: service to the motor is required, i.e. change the brushes (LED flashes YELLOW). These are samples of the types of messages that might be conveyed to the user. Many other messages could be conveyed as desired by designers of motor control circuit 225 using other colors or flashing patterns.

Figure 17:
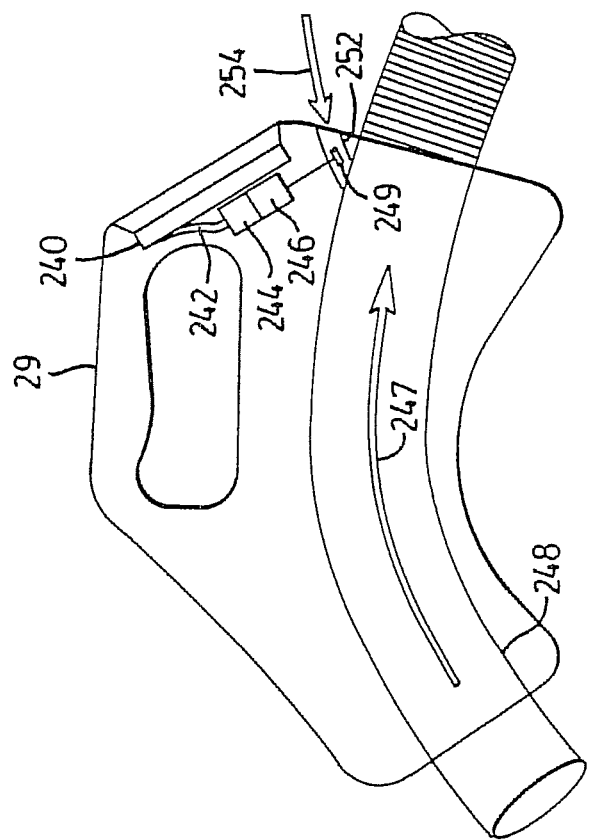
FIG. 17 is a cross-section of a hose handle utilizing a battery charging device in accordance with an embodiment of the present invention.

Referring to FIG. 17, in a manner similar to that described for the central control module 3, the remote control module 5 is mounted in a handle, for example handle 29, typically on a printed circuit board 240. It is to be noted that other handles, such as for example handles 20, 213 could be used. The printed circuit board 240 and other components of the central control module 3 could be fully encapsulated with simply a couple of wires 242 extending for connection to a power source 244. Messages are provided to the user 11 in the manner described previously herein. The messages provided to the user 11 include, for example, those previously described for the central control module 3.

The remote control module 5 is preferably battery 244 powered; however, it may also be powered from line voltage where it is available, using a drop down resistor and capacitor. Many vacuum hoses 217 have line voltage as it is used to power hose attachments 216, such as a power carpet brush. The battery 244 could be a rechargeable battery 244. Batteries 244 provide energy for limited durations. This duration for a rechargeable battery 244 is typically far shorter than that for a non-rechargeable battery 244. In order to avoid having to frequently change the battery 244, the battery 244 could be a rechargeable battery 244 that is recharged by using a generator 246 powered from vacuum air (arrows 247) flowing through the handle 29 to produce electrical energy. The generator could be powered by an impeller 249 that extends into vacuum air path 248. The impeller 249 would turn, causing the generator 246 to produce current for recharging the battery 244. The generator 246 would typically produce alternating current that would require an AC/DC converter and/or other battery charging circuitry 250 for charging the battery 244. The voltage may need to be stepped-up in order to provide sufficient voltage for charging the battery 244. Many designs for such converters, including step-up converters, are readily available and could be used for this purpose.

To avoid damage to the impeller 249 from passing dust particles, a separate impeller air path 252 can be provided for the impeller 249. The impeller air path 252 extends from the vacuum air path 248 through the handle 29 to allow ambient air 254 to be drawn in through the impeller air path 252 to the vacuum air path 248. The motion of the ambient air 254 flowing through impeller air path 252 causes the impeller 249 to turn. The motion of the impeller 249 then powers the generator 246. As an example, the impeller air path 252 could be a one-quarter inch hole. It is desirable to have a wide input power range, for example, 90-260 volts AC for worldwide use. The use of a 16 Amp 400 Volt triac in the central control module 3 will work with most commercially available motors used in residential central vacuum cleaning applications worldwide. If a relay is used to control the motor 9 then a different relay will likely be required for different voltages, amperages and regulatory requirements. The drop down circuits for powering the central control module 3 are preferably adapted to utilize this wide range of voltages as well using well known power conversion techniques. As described previously, for universal use with motors 9 having different, and perhaps unknown specifications, the central control module 3 can sense normal operating conditions and store them in memory. This process can be thought of as a learn mode for the control subsystem 1. During initial operation of the central control module 3, the module can sense the operating conditions of the motor 9. These can be stored in non-volatile memory 102 for the microprocessor 160. The stored operating conditions can then be used for a baseline against which the central control module 3 can compare when in use. In addition to motor 9 normal operating current, the stored conditions may include, for example, such conditions as vacuum pressure and ambient temperature. Ambient temperature varies from building to building, and this may affect what is considered to be "over temperature". Vacuum pressure may be sensed in many different ways, for example, surface mount pressure sensors are becoming widely available.

Figure 18:
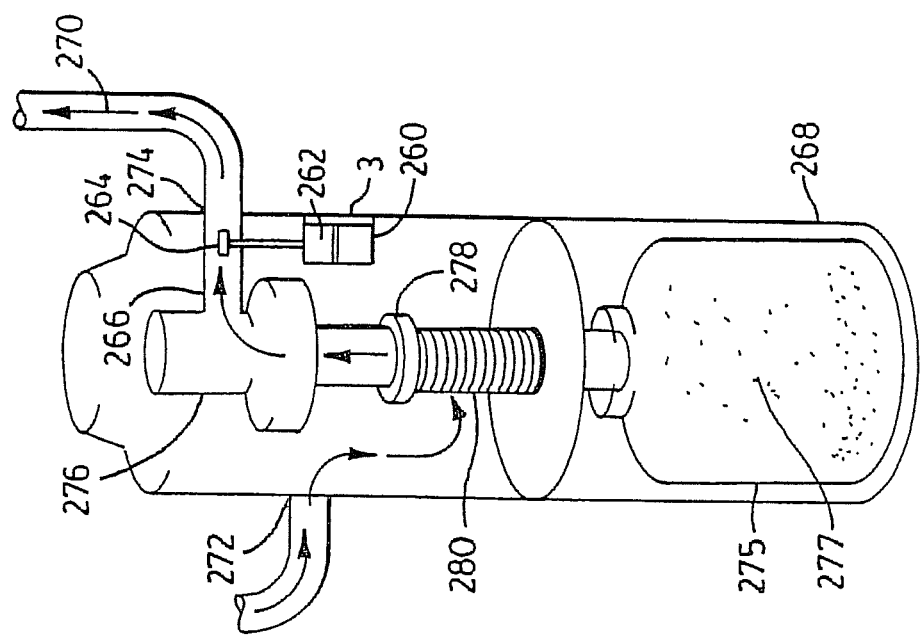
FIG. 18 is a cut-away partial perspective view of an alternate vacuum source for use in the cleaning system of FIG. 15 incorporating an embodiment of the subsystem of FIG. 15, including an air powered generator in accordance with an embodiment of the present invention.

Referring to FIG. 18, low voltage electrical components, such as central control module 3, could be similarly powered by a rechargeable battery 260 charged from a generator 262 having an impeller 264 placed in an exhaust air path 266 in central vacuum canister 268. The impeller 264 turns with the motion of air 270 flowing through the central cleaning system, for example, in the canister 268 from an inlet 272 to an outlet 274 over bag 275. Air flow is generated by suction motor 276. It is desirable, although not necessary, to place the impeller in the exhaust air path 266 as the air is typically filtered of dust particles 277 by a filter 278 after dust separator 280 and prior to motor 276. The filter reduces wear on the motor 276. Similarly, it reduces wear on the impeller 264.

Figure 19:
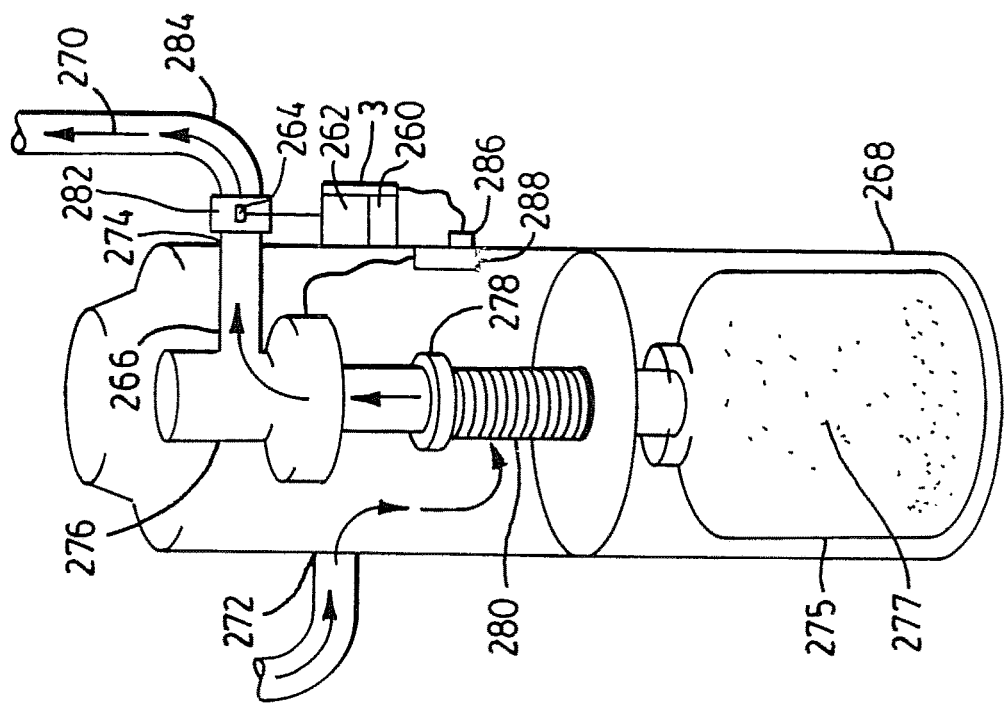
FIG. 19 is a cut-away partial perspective view of an alternate vacuum source for use in the cleaning system of FIG. 15 incorporating an embodiment of the subsystem of FIG. 15, including an air powered generator in accordance with an alternate embodiment of the present invention.

Referring to FIG. 19, for flexibility, for example in retrofit applications or as optional features, the central control module 3 and ancillary components, including battery 260 and generator 262, could be placed outside the canister 268. The impeller 264 could form part of a pipe insert 282 inserted after outlet 274 in the exhaust air piping 284. The insert 282 allows exhaust air to flow through, while placing the impeller 264 in the exhaust air path 270.

Optionally, the central control module 3 could connect to existing low voltage connectors 286 on the canister 286 to provide signals to an existing control unit 288 controlling the motor 276. Controlling motor 276 through an existing control unit 288 may limit available features and functions of the central control unit 3. Advantageously, for retrofit applications, the central control unit 3 would not require access to line voltage; however, the central control unit may not have access to the input current of the motor 276, preventing use of features related thereto.

Low voltage units that do not connect to line voltage would not require certification in most jurisdictions, or such requirements would be less strict.

It is to be noted that the use of a generator powered by air flowing through a cleaning system is not limited to central vacuum cleaning systems. For example, portable upright or canister vacuum cleaners may benefit from a generator powered by air flow for driving electrical devices within the cleaner. This may include a remote control module and central control module, such as those described herein that communicate between a handle and motor of the cleaner.

Figure 20:
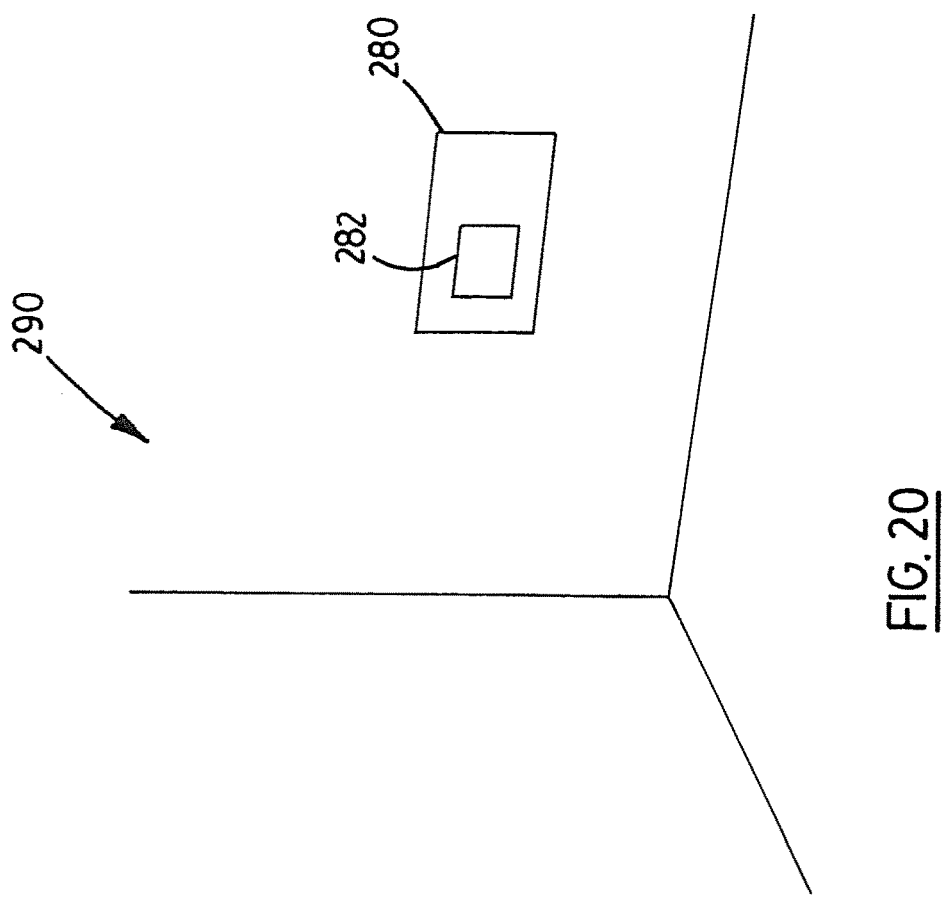
FIG. 20 is a perspective of a portion of a building incorporating remote station in accordance with an accordance with an embodiment of the present invention.

Referring to FIG. 20, a remote station 280 having a display 282, such as an LCD screen with or without touch screen functions, could be place within a building 290 to receive status information for the cleaning system 201. The remote station 280 could be mounted to a wall or elsewhere within the building 290, or it could be portable. The remote station 280 could communicate wirelessly with the motor control 3 in the same manner as the remote control module 5 in the handle 213. The remote station 280 may allow for two-way communication and, in this way, the remote station 280 can duplicate, replace or augment some or all of the functions of the remote control module 5. The screen of the remote station 280 could be larger than that of the remote control module 5.

The remote station 280 could also access other automated functions in the building 290. In this way, the need for multiple remote control screens in a building 290 could be reduced.

Communication between the remote station 280 and the central control module 3 can be through an intermediary transceiver, such as an x10 control module adapted to wirelessly receive signals from and transmit signals to the central control module 3 and to correspondingly transmit signals to the remote station 280 and receive signals from the remote station 280.

The transmission to and reception from the remote station 280 by the intermediary transceiver may be wireless or wired. For example, power line communication could be used, or network cabling. The remote station 280 could be a personal or other computer, or a dedicated device, such as an x10 compatible control panel.

It will be understood by those skilled in the art that this description is made with reference to the preferred embodiment and that it is possible to make other embodiments employing the principles of the invention which fall within its scope as defined by the following claims.

What is claimed is:

1. A central vacuum cleaning system comprising:
   (i) a vacuum source including:
      a motor within a motor housing,
      a receptacle extending from the motor housing for receiving dirt, and
      a motor control circuit including a variable speed controller for adjusting a speed of the motor;
   (ii) one or more valves;
   (iii) conduits for connecting to the vacuum source to the valves;
   (iv) a handle to be held by an operator, a flexible hose for releasably connecting the handle to one of the one or more valves, and a cleaning attachment connected to the handle, such that when the motor is activated during use of the system, dirt is drawn by a vacuum created by the vacuum source through the attachment, handle, hose, and conduits, and into the receptacle;
   (v) a user display at a display location on the handle for displaying information about an operating condition of the vacuum source;
   (vi) a user input interface at an input location on the handle for adjusting an operating speed of the motor control circuit;
   (vii) a communications system to transfer control signals from the user input interface to the variable speed controller of the motor control circuit to adjust the speed of the motor wherein the communications system comprises an RF wireless transmitter in the handle, and an RF wireless receiver at the motor control circuit.

2. The central vacuum cleaning system of claim 1, comprising:
   a sensor for sensing an operating condition of the motor; and
   a remote module receiving, through a wireless communications medium from the motor control circuit, signals indicating the operating condition of the central vacuum cleaning system, the remote module being a wireless module located remote from both the motor control circuit and from the handle.

3. The system of claim 2 wherein the remote module is a microprocessor enabled portable wireless module.

4. The system of claim 2 wherein the remote module is adapted to be mounted to a wall.

5. The system of claim 2 wherein the communications medium is a bi-directional medium, the remote module being configured to provide control signals to the motor control circuit in response to user input at the remote module.

6. The system of claim 2 wherein the remote module is configured to communicate with a plurality of automated functions located within a building that the system is located within.

7. The system of claim 2 wherein the remote module includes a user interface for receiving user input and providing corresponding control signals over the communications medium to the motor control circuit, the motor control circuit being responsive to a predetermined control signals to adjust an operating speed of the motor in response to user inputs at the user interface.

8. The system of claim 7 wherein the user interface includes a variable speed control input for adjusting the operating speed of the motor between a plurality of running speeds.

9. The system of claim 2 wherein the user interface and the user input interface each includes a respective touch screen display.

10. The system of claim 1 including a microprocessor enabled wireless, portable control module for controlling the motor control circuit, the portable control module comprising:
   a transceiver for exchanging signals over a wireless communications medium;

a screen for displaying information regarding one or more operating conditions of the central vacuum cleaning system in dependence on signals received through the transceiver;

a user interface for receiving user inputs and providing signals to the transceiver for transmission to the motor control circuit in dependence thereon.

11. The system of claim 10 wherein the user interface is integrated into the screen as a touch screen.

12. The system of claim 10 wherein the portable control module is located apart from any other component of the central vacuum cleaning system.

13. The system of claim 12 wherein the portable control module is configured to perform multiple functions unrelated to the central vacuum cleaning system.

14. The system of claim 10 wherein the portable control module is configured to provide signals to the motor control circuit requesting information therefrom.

* * * * *